(12) United States Patent
Watanabe

(10) Patent No.: US 8,588,053 B2
(45) Date of Patent: Nov. 19, 2013

(54) TRANSMITTING APPARATUS, TRANSMISSION CONTROL METHOD, AND COMMUNICATION APPARATUS

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 12/787,940

(22) Filed: May 26, 2010

(65) Prior Publication Data

US 2010/0232538 A1 Sep. 16, 2010

Related U.S. Application Data

(63) Continuation of application No. PCT/JP2007/073465, filed on Dec. 5, 2007.

(51) Int. Cl.
*H04J 11/00* (2006.01)

(52) U.S. Cl.
USPC .......................................... 370/203; 370/329

(58) Field of Classification Search
USPC ......... 370/203–208, 282, 310, 464, 480–483; 455/91, 101, 103, 114.2, 132, 561, 455/562.1
See application file for complete search history.

(56) References Cited

U.S. PATENT DOCUMENTS

| | | | |
|---|---|---|---|
| 5,999,826 A | 12/1999 | Whinnett | |
| 7,136,624 B2 | 11/2006 | Ofuji et al. | |
| 7,227,093 B2 | 6/2007 | Kimura et al. | |
| 7,649,831 B2 * | 1/2010 | Van Rensburg et al. | 370/203 |
| 8,228,810 B2 * | 7/2012 | Zhou et al. | 370/252 |
| 8,238,225 B2 * | 8/2012 | Wennstrom | 370/203 |
| 2002/0187753 A1 | 12/2002 | Kim et al. | |
| 2003/0021353 A1 | 1/2003 | Hiramatsu et al. | |
| 2003/0181163 A1 | 9/2003 | Ofuji et al. | |
| 2005/0148369 A1 | 7/2005 | Hiramatsu et al. | |
| 2005/0197162 A1 | 9/2005 | Fujishima et al. | |
| 2005/0249304 A1 * | 11/2005 | Takano et al. | 375/267 |
| 2006/0023803 A1 | 2/2006 | Perlman et al. | |
| 2006/0279460 A1 * | 12/2006 | Yun et al. | 342/377 |
| 2007/0025464 A1 | 2/2007 | Perlman | |

(Continued)

FOREIGN PATENT DOCUMENTS

| | | |
|---|---|---|
| AU | 2003200401 A1 | 8/2003 |
| AU | 2003200401 B2 | 8/2003 |

(Continued)

OTHER PUBLICATIONS

Korean Office Action dated May 26, 2011 for application No. 10-2010-7012074.

(Continued)

*Primary Examiner* — Michael Thier
*Assistant Examiner* — Curtis A Alia
(74) *Attorney, Agent, or Firm* — Smith, Gambrell & Russell, LLP

(57) ABSTRACT

A transmitting apparatus multiplexes transmit signals to receiving apparatuses according to weight vectors, and transmits the multiplexed transmit signals wirelessly using antennas. Here, a controller of the transmitting apparatus first selects a first receiving apparatus and allocates a weight vector to it. Next, the controller outputs, to a second receiving apparatus, data on candidates of a weight vector available in parallel with the weight vector allocated to the first receiving apparatus. Then, the controller allocates the weight vector to the second receiving apparatus based on feedback data from the second receiving apparatus.

8 Claims, 13 Drawing Sheets

(56) References Cited

U.S. PATENT DOCUMENTS

| | | | |
|---|---|---|---|
| 2007/0086540 A1* | 4/2007 | Chae et al. | 375/267 |
| 2007/0099666 A1* | 5/2007 | Astely et al. | 455/562.1 |
| 2007/0183414 A1 | 8/2007 | Hoshino et al. | |
| 2008/0051150 A1* | 2/2008 | Tsutsui | 455/562.1 |
| 2008/0299917 A1* | 12/2008 | Alexiou et al. | 455/103 |
| 2009/0196272 A1 | 8/2009 | Tsutsui | |

FOREIGN PATENT DOCUMENTS

| | | |
|---|---|---|
| CA | 2418524 A1 | 2/2003 |
| CN | 1387327 A | 12/2002 |
| CN | 1521958 A | 8/2004 |
| EP | 1335618 A2 | 8/2003 |
| EP | 1335618 B1 | 11/2005 |
| EP | 1748579 A1 | 1/2007 |
| JP | 10117162 | 5/1998 |
| JP | 2003514431 A | 4/2003 |
| JP | 2003235072 | 8/2003 |
| JP | 2005252521 | 9/2005 |
| JP | 2006005908 | 1/2006 |
| JP | 2006081162 | 3/2006 |
| JP | 2006157588 | 6/2006 |
| JP | 2006273018 | 10/2006 |
| JP | 2008092433 | 4/2008 |
| KR | 1020050044813 | 5/2005 |
| WO | 0135548 A1 | 5/2001 |
| WO | 2005078957 A1 | 8/2005 |
| WO | 2005114874 A1 | 12/2005 |
| WO | 2007114654 A1 | 10/2007 |
| WO | 2008032358 A1 | 3/2008 |

OTHER PUBLICATIONS

InterDigital Communications, LLC, "MU-MIMO Codebook Selection and Signaling Considerations for E-UTRA", 3GPP TSG RAN WG1 Meeting #50bis, R1-074386, dated Oct. 2, 2007.

International Search Report dated Jan. 22, 2008 in corresponding International application No. PCT/JP2007/073465.

Chinese First Notification of Office Action dated Jul. 4, 2012 issued in Application No. 200780101784.5.

Japanese Office Action dated Jun. 12, 2012 issued in application No. 2009-544528.

3 GPP TSG RAN WG1 #48, St Louis, MO USA, Feb. 12-16, 2007; R1-071043; Source: Ericsson; Title: CQI Delay Impact on Codebook based Precoding for E-UTRA DL 2×2 System; Agenda Item: 6.7.2.

3GPP TSG RAN WG1 Meeting #49bis; Orlando, FL, USA, Jun. 25-29, 2007; R1-073100; Agenda Item: 5.10.2; Source: Samsung; Title: Way Forward for MU-MIMO Design.

Extended European Search Report dated Jul. 16, 2012 issued in 07850107.9-1246/2219309.

* cited by examiner $$y = Wx = \begin{bmatrix} w_{11} & w_{12} & \cdots & w_{1n} \\ w_{21} & w_{22} & \cdots & w_{2n} \\ \vdots & \vdots & \ddots & \vdots \\ w_{m1} & w_{m2} & \cdots & w_{mn} \end{bmatrix} \begin{bmatrix} x_1 \\ x_2 \\ \vdots \\ x_n \end{bmatrix}$$

FIG. 5

$$C_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$
(000)

$$C_1 = \begin{bmatrix} 0.3780 & -0.2698 + j\,0.5668 & 0.5957 - j\,0.1578 & 0.1587 + j\,0.2411 \\ -0.2698 - j\,0.5668 & 0.3665 & 0.4022 + j\,0.4743 & -0.1509 + j\,0.2492 \\ 0.5957 + j\,0.1578 & 0.4022 - j\,0.4743 & 0.3804 & -0.0908 - j\,0.2721 \\ 0.1587 - j\,0.2411 & -0.1509 - j\,0.2492 & -0.0908 + j\,0.2721 & 0.8660 \end{bmatrix}$$
(001)

⋮

$$C_7 = \begin{bmatrix} 0.3780 & 0.0618 + j\,0.3332 & -0.3456 - j\,0.5029 & -0.5704 - j\,0.2113 \\ 0.0618 - j\,0.3332 & 0.8154 & 0.3037 - j\,0.1352 & 0.1698 - j\,0.2845 \\ -0.3456 + j\,0.5029 & 0.3037 + j\,0.1352 & 0.4015 & -0.4877 + j\,0.3437 \\ -0.5704 + j\,0.2113 & 0.1698 + j\,0.2845 & -0.4877 - j\,0.3437 & 0.4052 \end{bmatrix}$$
(111)

FIG. 6

TRANSMITTING APPARATUS, TRANSMISSION CONTROL METHOD, AND COMMUNICATION APPARATUS

This application is a continuing application, filed under 35 U.S.C. §111(a), of International Application PCT/JP2007/073465, filed Dec. 5, 2007.

FIELD

The embodiments described herein relate to a transmitting apparatus, a transmission control method, and a communication apparatus.

BACKGROUND

Radio communication systems have been widely used today, including cellular phone systems and wireless local area networks (wireless LANs). Further, the development of a high-speed and large-capacity radio communication system is being advanced so as to respond to the increase in access to the Internet using a radio communication terminal such as a cellular phone handset or use of a music and image distribution service. For example, in a 3rd generation partnership project (3GPP) which performs standards work of cellular phone systems, specifications of a next-generation cellular phone system such as a long-term evolution (LTE) are examined.

Here, as one technique for realizing a high-speed and large-capacity mobile communication system, the multi-antenna transmission techniques for transmitting a transmit signal wirelessly using a plurality of antennas are used. As the multi-antenna transmission techniques, various methods are considered depending on how a plurality of antennas are used. For example, there are considered a diversity system for transmitting a signal with the same content from a plurality of antenna to improve radio communication quality, a multiple input multiple output (MIMO) multiplex system for transmitting a signal with different content from each antenna to improve a transmission rate, and a beam forming system for outputting a directional beam from each antenna toward the direction in which a receiving apparatus is present to improve an antenna gain.

When multiplexing a transmit signal to a plurality of receiving apparatuses using a plurality of antennas, a transmitting apparatus weighs a transmit signal to each receiving apparatus by a column (weight vector) of coefficients for adjusting a phase or amplitude, thereby multiplexing it using a part or the entire of the plurality of antennas. In this case, preferably, the transmitting apparatus dynamically allocates a weight vector to the receiving apparatus at the time of the transmission so that the communication quality may be satisfactory. The throughput of the entire radio communication system is improved by allocating the weight vector to the receiving apparatus in consideration of communication states of the plurality of receiving apparatuses, the transmitting apparatus makes a contribution to improving a throughput of the entire radio communication system.

As a method for controlling the allocation through the transmitting apparatus, there is disclosed an open loop control method in which the transmitting apparatus performs an estimation process of the communication quality of a link (reverse link) to the transmitting apparatus from each receiving apparatus and autonomously determines the allocation (see, for example, Japanese. Laid-open Patent Publication No. 2003-235072). Also, there is disclosed a closed loop control method in which each receiving apparatus performs an estimation process of the communication quality of a link (forward link) to each receiving apparatus from the transmitting apparatus and transmits feedback data to the transmitting apparatus, and the transmitting apparatus determines the allocation based on the feedback data (see, for example, Japanese Laid-open Patent Publication No. 2006-81162).

As a method for controlling an allocation of a weight vector through a transmitting apparatus, a method for determining the allocation based on feedback data from each receiving apparatus is excellent in terms of maintaining a preferable communication quality. The reason is that the communication quality of a forward link and that of a reverse link are not necessarily corresponded to each other.

However, there is a problem that in a conventional technique as disclosed in the Patent Document 2, a processing burden at the time of determining the allocation is large. The transmitting apparatus preferably selects a combination of the optimal weight vectors capable of suppressing interference between transmit signals from among a plurality of candidates of the weight vector to allocate the weight vector to each receiving apparatus. In other words, each receiving apparatus needs to perform an estimation process of the communication quality with respect to the plurality of candidates of the weight vector so that the transmitting apparatus can appropriately determine the allocation. For the purpose of performing an estimation process of the communication quality, there is a problem of increase in a processing burden, circuit size and power consumption of each receiving apparatus. In addition, the amount of data of the feedback data from each receiving apparatus to the transmitting apparatus also becomes large and therefore, is turned to be an oppression factor of a communication band of the reverse link.

SUMMARY

According to an aspect of the invention, there is provided a transmitting apparatus to multiplex transmit signals to a plurality of receiving apparatuses according to a weight vector allocated to each receiving apparatus and transmit the multiplexed transmit signals wirelessly using a plurality of antennas. The transmitting apparatus includes a controller to select a first receiving apparatus from the plurality of receiving apparatuses on a prescribed basis, allocate a weight vector to the first receiving apparatus, output data on candidates for weight vector available in parallel with the weight vector allocated to the first receiving apparatus to a second receiving apparatus different from the first receiving apparatus among the plurality of receiving apparatuses, receive feedback data on the candidates for weight vector from the second receiving apparatus, and allocate a weight vector to the second receiving apparatus based on the feedback data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 5 illustrates a relationship between a transmit signal and a weight vector;

FIG. 6 illustrates a configuration example of a code book;

DESCRIPTION OF EMBODIMENT(S)

Figure 1:
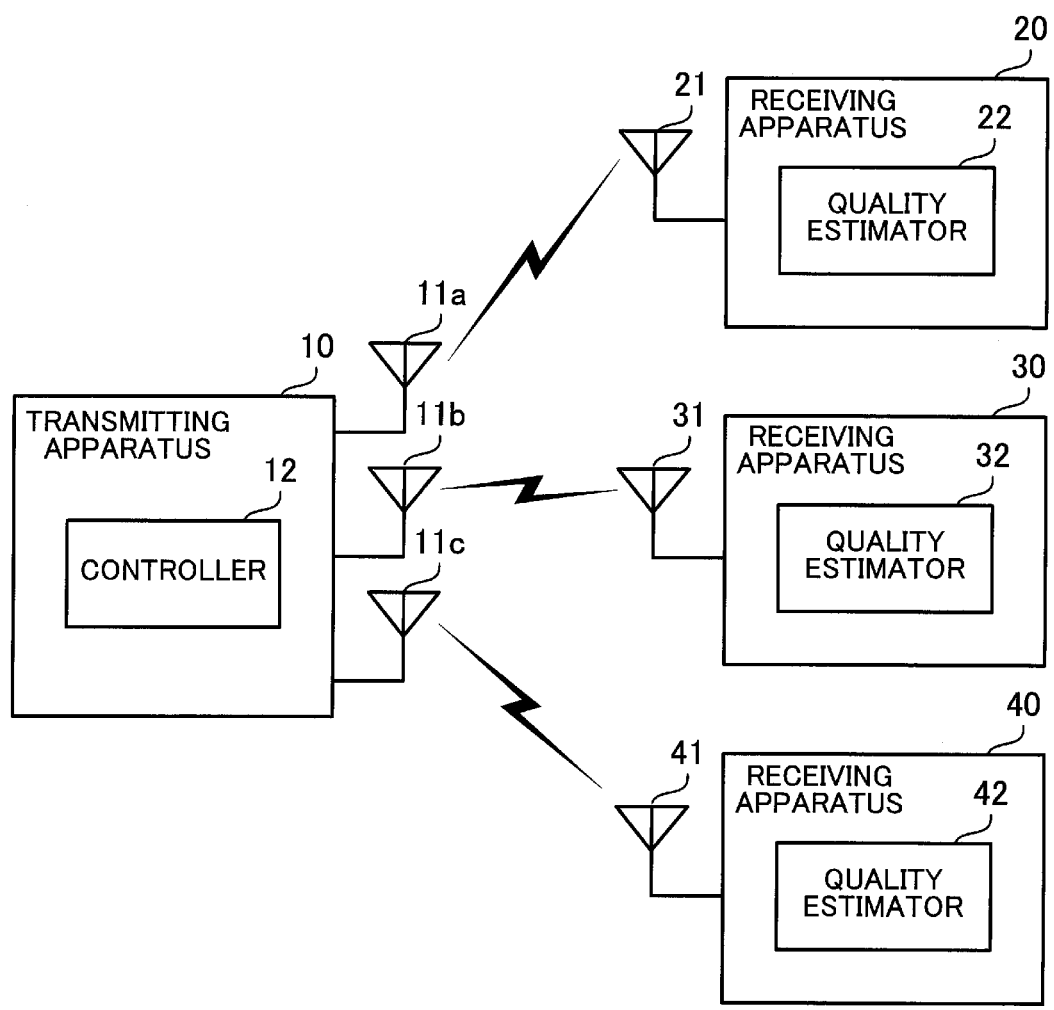
FIG. 1 illustrates a present embodiment.

Embodiments of the present invention will be described in detail below with reference to the accompanying drawings, wherein like reference numerals refer to like elements throughout.

FIG. 1 illustrates the present embodiment. In a radio communication system illustrated in FIG. 1, a transmitting apparatus 10 performs multi-antenna transmission of transmit signals to receiving apparatuses 20, 30, and 40 using antennas 11a, 11b, and 11c.

The transmitting apparatus 10 has the antennas 11a, 11b, and 11c, and a controller 12. The antennas 11a, 11b, and 11c transmit a transmit signal wirelessly to the receiving apparatuses 20, 30, and 40 under the control of the controller 12. The controller 12 allocates weight vectors applied to the multi-antenna transmission to the receiving apparatuses 20, 30, and 40, and controls the output of radio signals via the antennas 11a, 11b, and 11c.

Specifically, the controller 12 first selects a first receiving apparatus from the receiving apparatuses 20, 30, and 40 at a prescribed basis, and allocates a weight vector to the first receiving apparatus. The controller 12 may select the first receiving apparatus based on priority and communication quality of packet data for transmission. For example, the controller 12 previously allocates an optimal weight vector for the receiving apparatus to the receiving apparatus which receives packet data with high priority or the receiving apparatus with preferable communication quality. Here, the controller 12 can determine the weight vector to be allocated to the first receiving apparatus based on feedback data from the first receiving apparatus.

Next, the controller 12 outputs data on candidates of the weight vector available in parallel with that allocated to the first receiving apparatus to a second receiving apparatus different from the first receiving apparatus. The controller 12 selects a weight vector with a low level of interference with the weight vector allocated to the first receiving apparatus as candidates of the weight vector. In addition, the transmitting apparatus 10 may transmit data on the candidates of the weight vector wirelessly to the second receiving apparatus using a forward link or via another radio apparatus.

The controller 12 receives feedback data on the candidates of the weight vector from the second receiving apparatus, and allocates the weight vector to the second receiving apparatus based on the feedback data. At this time, the feedback data includes an estimated result of reception quality on the candidates of the weight vector notified by the controller 12.

Here, the antennas 11a, 11b, and 11c may be associated one-to-one with the receiving apparatuses 20, 30, and 40 such that the antenna 11a outputs a signal to the receiving apparatus 20 and the antenna 11c outputs a signal to the receiving apparatus 40. Further, phase and amplitude of a signal are adjusted and the antennas 11a, 11b, and 11c may be associated many-to-many with the receiving apparatuses 20, 30, and 40 as follows. That is, the antennas 11a and 11b output signals to the receiving apparatus 20, and the antennas 11b and 11c output signals to the receiving apparatus 40. The above-described association is defined by the weight vector.

Each receiving apparatus 20, 30, 40 has a respective antenna 21, 31, 41, and a respective quality estimator 22, 32, 42. Each antenna 21, 31, 41 receives a radio signal transmitted from at least a part of the antennas 11a, 11b, and 11c of the transmitting apparatus 10. Each quality estimator 22, 32, 42 performs an estimation process of the radio communication quality of the forward link, and outputs the feedback data indicating the estimated result according to instructions from the transmitting apparatus 10.

Specifically, when the transmitting apparatus 10 fails to specify the candidates of the weight vector, each quality estimator 22, 32, 42 performs an estimation process of the communication quality so as to select the optimal weight vector from among all the weight vectors. On the other hand, when the transmitting apparatus 10 specifies the candidates of the weight vector, each quality estimator 22, 32, 42 may perform an estimation process of the communication quality in the range necessary for selecting an appropriate weight vector from among the specified candidates of the weight vector. Then, each quality estimator 22, 32, 42 outputs the feedback data indicating the estimated result. In addition, each receiving apparatus 20, 30, 40 may transmit the feedback data wirelessly to the transmitting apparatus 10 using the reverse link or via another radio apparatus.

As a specific example, the present embodiment assumes here that the receiving apparatus 20 is selected as the first receiving apparatus. In this case, the transmitting apparatus 10 first instructs the receiving apparatus 20 to perform an estimation process of the communication quality without limiting the weight vector. While responding to this instruction, the receiving apparatus 20 performs an estimation process of the communication quality with respect to all the weight vectors contained in the candidates (e.g., candidates of M ways) of a plurality of the weight vectors, and transmits the feedback data indicating the estimated result to the transmitting apparatus 10. Then, the transmitting apparatus 10 allocates the optimal weight vector to the receiving apparatus 20 based on the feedback data from the receiving apparatus 20.

Next, the transmitting apparatus 10 identifies the candidates (e.g., candidates of N (N<M) ways) of the weight vector available in parallel with the weight vector allocated to the receiving apparatus 20, and specifies the candidates of the weight vector and instructs the receiving apparatuses 30 and 40 to perform an estimation process of the communication quality. While responding to this instruction, each receiving apparatus 30, 40 performs an estimation process of the communication quality in the range of the candidates of the specified weight vector, and transmit the feedback data indicating the estimated result to the transmitting apparatus 10. Then, the transmitting apparatus 10 allocates an appropriate weight vector to each receiving apparatus 30, 40 based on the feedback data from each receiving apparatus 30, 40.

In addition, the transmitting apparatus 10 may simultaneously transmit the instruction of the estimation process of the communication quality and allocate the weight vector to the receiving apparatuses 30 and 40 as the second receiving apparatus. Or, alternatively, the transmitting apparatus 10 may transmit the instruction of the estimation process of the communication quality and allocate the weight vector to the receiving apparatuses 30 and 40 one by one in sequence.

As can be seen from the above description, the transmitting apparatus 10 in the proposed radio communication system first selects the first receiving apparatus from the receiving apparatuses 20, 30, and 40 at a prescribed basis and allocates the weight vector to the first receiving apparatus. Next, the transmitting apparatus 10 transmits data on the candidates of the weight vector available in parallel with the weight vector allocated to the first receiving apparatus to the second receiving apparatus different from the first receiving apparatus among the receiving apparatuses 20, 30, and 40. The second receiving apparatus performs an estimation process of the communication quality in the range of the candidates of the specified weight vector, and sends back the feedback data to the transmitting apparatus 10. Then, the transmitting apparatus 10 allocates the weight vector to the second receiving apparatus based on the feedback data from the second receiving apparatus.

The transmitting apparatus 10 makes it possible to allocate the optimal weight vector according to communication states to the receiving apparatus selected as the first receiving apparatus among the receiving apparatuses 20, 30, and 40. On the other hand, the transmitting apparatus 10 makes it possible to limit target range of the estimation process of the communication quality and suppress a processing burden, a circuit size and power consumption with respect to the receiving apparatus selected as the second receiving apparatus. In addition, the transmitting apparatus 10 makes it possible to suppress the amount of data of the feedback data from the receiving apparatuses 20, 30, and 40 to the transmitting apparatus 10, and suppress a band for the feedback data occupied in the entire communication band of the reverse link.

Since the transmitting apparatus 10 gives to a transmit signal a weight that a reception is preferably performed in the receiving apparatus, when fundamentally demodulating a receive signal, the receiving apparatuses 20, 30, and 40 can receive a desired receive signal.

When the transmitting apparatus 10 transmits a different sub-carrier for each antenna and a predetermined known signal (pilot signal) using a code, the receiving apparatus 20 (30, 40) can receive transmission line data for each antenna. Therefore, the transmitting apparatus can identify the optimal weight (e.g., weight that reception quality becomes best) from the candidates of the weight based on the received transmission line data for each antenna.

First Embodiment

A first embodiment of the present invention will now be described in detail below with reference to FIG. 2 and subsequent drawings.

Figure 2:
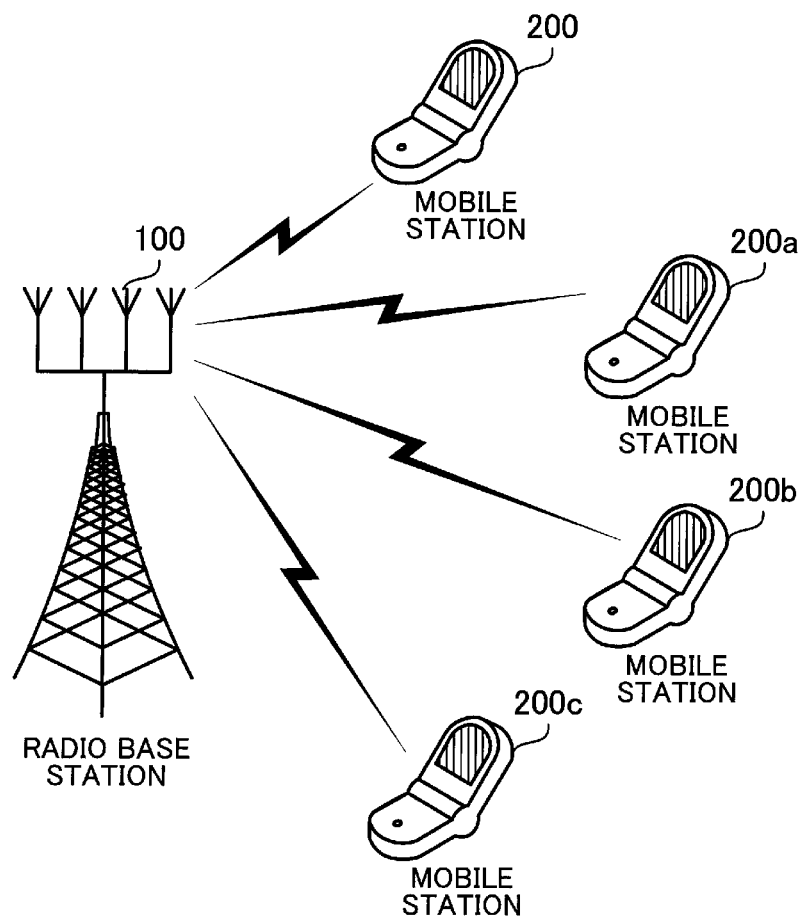
FIG. 2 illustrates a system configuration according to a first embodiment.

FIG. 2 illustrates a system configuration according to the first embodiment. A mobile communication system according to the first embodiment provides a radio communication system in which a radio base station communicates wirelessly with a plurality of mobile stations. This mobile communication system includes a radio base station 100 and mobile stations 200, 200a, 200b, and 200c.

The radio base station 100 is a communication device which forwards packet data between each mobile station 200, 200a, 200b, 200c visiting its radio coverage area, or cell and a mobile station of its communication partner. The radio base station 100 includes four transmitting and receiving antennas. Using the four transmitting and receiving antennas, the radio base station 100 performs multi-antenna communication using a precoding MIMO system with the mobile stations 200, 200a, 200b, and 200c.

Each mobile station 200, 200a, 200b, 200c is a cellular phone terminal which performs communication with another mobile station or computer via the radio base station 100, for example, a cellular phone handset. Each mobile station 200, 200a, 200b, 200c transmits, as a radio signal, packet data or control parameters to the radio base station 100. Further, each mobile station 200, 200a, 200b, 200c receives packet data or control parameters, addressed to itself, transmitted as a radio signal by the radio base station 100. Here, each mobile station 200, 200a, 200b, 200c can receive a part or the whole of radio signals transmitted from the four antennas of the radio base station 100, and perform selection and synthesis of the signals, if necessary.

Figure 3:
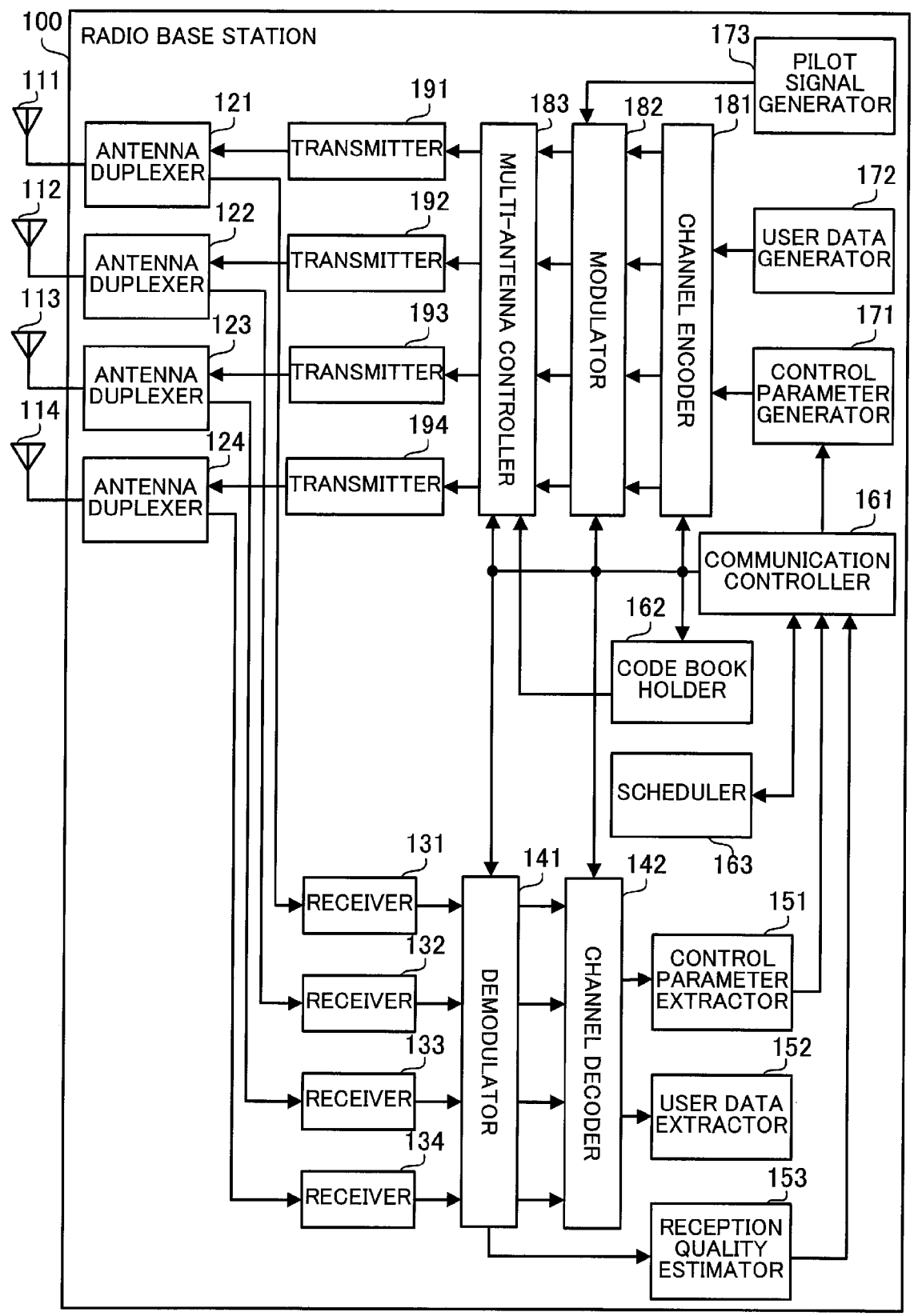
FIG. 3 is a block diagram illustrating a function of a radio base station according to the first embodiment.

FIG. 3 is a block diagram illustrating a function of the radio base station according to the first embodiment. The radio base station 100 includes transmitting and receiving antennas 111, 112, 113, and 114, antenna duplexers 121, 122, 123, and 124, receivers 131, 132, 133, and 134, a demodulator 141, a channel decoder 142, a control parameter extractor 151, a user data extractor 152, a reception quality estimator 153, a communication controller 161, a code book holder 162, scheduler 163, a control parameter generator 171, a user data generator 172, a pilot signal generator 173, a channel encoder 181, a modulator 182, a multi-antenna controller 183, and transmitters 191, 192, 193, and 194.

Each transmitting and receiving antenna 111, 112, 113, 114 is a transmission-reception shared antenna. The four transmitting and receiving antennas 111, 112, 113, and 114 are installed such that spatial correlation between antennas is reduced. There are taken measures such as, for example, an installation distance between antennas is set to be sufficiently wider than a wavelength of a carrier wave, and horizontal and vertical polarization is used.

The transmitting and receiving antenna 111 supplies a receive signal from the mobile stations 200, 200a, 200b, and 200c to the antenna duplexer 121, and transmits a transmit signal supplied from the antenna duplexer 121 wirelessly. Similarly, each transmitting and receiving antenna 112, 113, 114 supplies a receive signal to each antenna duplexer 122, 123, 124, and transmits a transmit signal supplied from each antenna duplexer 122, 123, 124 wirelessly.

Each antenna duplexer 121, 122, 123, 124 is a device which separates a transmit signal and a receive signal. The antenna duplexer 121 supplies a receive signal supplied from the transmitting and receiving antenna 111 to the receiver 131, and supplies a transmit signal supplied from the transmitter 191 to the transmitting and receiving antenna 111. Similarly, each antenna duplexer 122, 123, 124 supplies a receive signal supplied from each transmitting and receiving antenna 112, 113, 114 to each receiver 132, 133, 134, and supplies a transmit signal supplied from each transmitter 192, 193, 194 to each transmitting and receiving antenna 112, 113, 114.

Each receiver 131, 132, 133, 134 converts a receive signal supplied from each antenna duplexer 121, 122, 123, 124 to a baseband signal, and supplies the converted baseband signal to the demodulator 141. For this conversion processing, for example, each receiver 131, 132, 133, 134 includes a low noise amplifier (LNA), a frequency converter, a band-limiting filter, an analog to digital (AD) converter, and a quadrature demodulator.

The demodulator 141 demodulates a baseband signal supplied from the receivers 131, 132, 133, and 134 under the control of the communication controller 161 according to a demodulation method corresponding to an uplink data communication. Then, the demodulator 141 supplies the demodulated signal to the channel decoder 142.

The channel decoder 142 decodes the demodulated signal supplied from the demodulator 141 under the control of the communication controller 161 according to a decoding method corresponding to the uplink data communication. For example, the channel decoder 142 applies a de-interleaving process and error correction process. Then, the channel decoder 142 supplies the obtained decoded data to the control parameter extractor 151 and the user data extractor 152.

The control parameter extractor 151 extracts control parameters produced by the mobile stations 200, 200a, 200b, and 200c from the decoded data blocks supplied from the channel decoder 142, and outputs the extracted control parameters to the communication controller 161. Here, the extracted control parameter includes feedback data in relation to the allocation of the weight vector and data indicating measurement results of the communication quality of the downlink transmission line.

The user data extractor 152 extracts user data blocks from among the decoded data blocks supplied from the channel decoder 142, and takes the extracted user data blocks into the inside. The user data extractor 152 transfers the taken user data blocks as packet data according to its destination.

The reception quality estimator 153 continuously performs an estimation process of the communication quality of each uplink transmission line from the mobile stations 200, 200a, 200b, and 200c to the radio base station 100 based on the demodulated signal supplied from the demodulator 141. The reception quality estimator 153 performs an estimation process of the communication quality based on, for example, a pilot signal intermittently transmitted by the mobile stations 200, 200a, 200b, and 200c. Then, the reception quality estimator 153 outputs the estimated result to the communication controller 161.

The communication controller 161 controls operations within the radio base station 100 based on the control parameters supplied from the control parameter extractor 151, the estimated result of the communication quality supplied from the reception quality estimator 153, and the instruction from the scheduler 163.

For example, the communication controller 161 determines a communication method such as a modulation method and encoding method applied to the mobile stations 200, 200a, 200b, and 200c, and controls the demodulator 141, the channel decoder 142, the channel encoder 181, and the modulator 182. The communication controller 161 determines the weight vectors allocated to the mobile stations 200, 200a, 200b, and 200c in reference to the code book holder 162, and controls the multi-antenna controller 183. Further, the communication controller 161 instructs the control parameter generator 171 to transmit the control parameters to the mobile stations 200, 200a, 200b, and 200c, if necessary.

The code book holder 162 holds a code book in which a combination of the weight vectors available in parallel with each other is defined. The code book holder 162 notifies the multi-antenna controller 183 of the weight vectors allocated to the mobile stations 200, 200a, 200b, and 200c under the control of the communication controller 161.

The scheduler 163 obtains the control parameters extracted by the control parameter extractor 151 and the result estimated by the reception quality estimator 153 via the communication controller 161, and manages the allocation of radio resources (resources designated by their time slots and frequency bands) based on the above-described data blocks. The scheduler 163 continuously notifies the communication controller 161 of the allocation results on radio resources to the mobile stations 200, 200a, 200b, and 200c.

The control parameter generator 171 generates the control parameters, used for the communication control, addressed to the mobile stations 200, 200a, 200b, and 200c according to the instruction from the communication controller 161, and outputs the generated control parameters to the channel encoder 181. Here, the control parameter to be transmitted through the downlink transmission line includes data indicating a multi-antenna communication method, data indicating a feedback data request for allocating the weight vector, data indicating an encoding method of user data, and allocation information on radio resources through the uplink transmission line.

The user data generator 172 generates user data addressed to the mobile stations 200, 200a, 200b, 200c, and supplies the generated user data to the channel encoder 181.

The pilot signal generator 173 generates a pilot signal of a predetermined signal sequence, and supplies the generated pilot signal to the modulator 182. For example, the mobile stations 200, 200a, 200b, and 200c use the pilot signal to estimate the communication quality of the downlink transmission line.

The channel encoder 181 applies an encoding process to the control parameters supplied from the control parameter generator 171 and the user data supplied from the user data generator 172 according to the encoding method corresponding to the downlink data communication under the control of the communication controller 161. For example, the channel encoder 181 applies an interleaving process and error correction encoding process. Then, the channel encoder 181 supplies encoded data to the modulator 182.

The modulator 182 applies a process to the encoded data supplied from the channel encoder 181 according to a modulation method corresponding to the downlink data communication under the control of the communication controller 161. For example, the modulator 182 applies a modulation process such as quadrature phase shift keying (QPSK) and quadrature amplitude modulation (QAM) and a bit repetition process. Further, the modulator 182 inserts the pilot signal supplied from the pilot signal generator 173 into the modulated signal. Then, the modulator 182 outputs the modulated signal to the multi-antenna controller 183.

The multi-antenna controller 183 applies a weighting process to the modulated signal supplied from the modulator 182 under the control of the communication controller 161. Specifically, the multi-antenna controller 183 obtains the weight vectors allocated to the mobile stations 200, 200a, 200b, and 200c from the code book holder 162, and applies the weight vectors to the modulated signals, thereby producing the baseband signal for each transmitting and receiving antenna.

Then, the multi-antenna controller 183 outputs to the transmitter 191 the baseband signal corresponding to the transmitting and receiving antenna 111. Similarly, the multi-antenna controller 183 outputs to each transmitter 192, 193, 194 the baseband signal corresponding to each transmitting and receiving antenna 112, 113, 114.

Each transmitter 191, 192, 193, 194 converts the baseband signal supplied from the multi-antenna controller 183 to a transmit signal for transmission, and supplies the transmit signal to each antenna duplexer 121, 122, 123, 124. For the purpose of applying this conversion process, each transmitter 191, 192, 193, 194 has, for example, a quadrature modulator, a digital to analog (DA) converter, a frequency converter, a band-limiting filter, and a power amplifier.

In addition, the pilot signals inserted to the subcarrier by the modulator 182 are arranged to be mutually orthogonal in each transmitting and receiving antenna. This enables the mobile stations 200, 200a, 200b, and 200c to identify a radio signal transmitted from the transmitting and receiving antennas 111, 112, 113, and 114 and estimate the communication quality.

Figure 4:
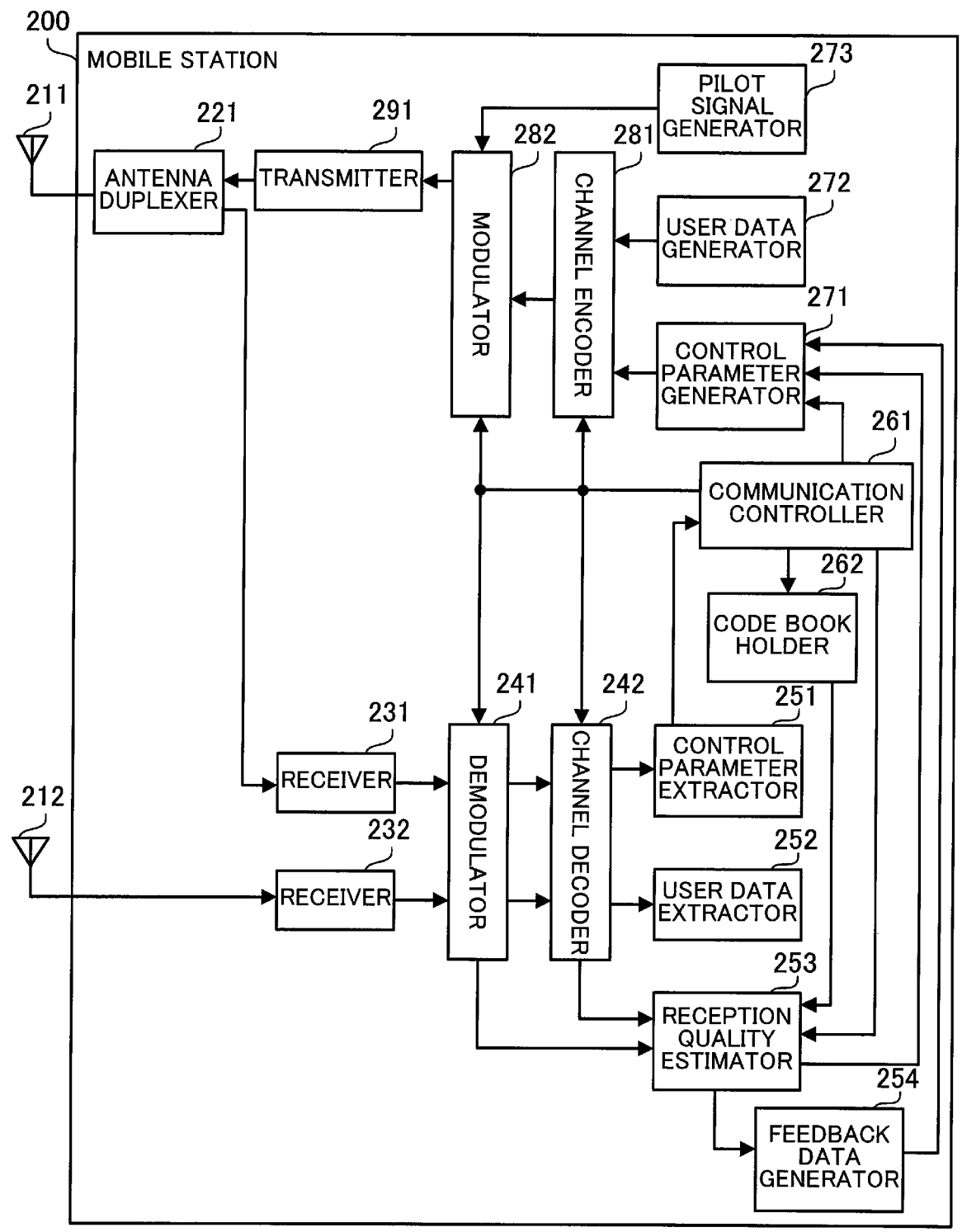
FIG. 4 is a block diagram illustrating a function of a mobile station according to the first embodiment.

FIG. 4 is a block diagram illustrating a function of the mobile station according to the first embodiment. The mobile station 200 includes a transmitting and receiving antenna 211, a receiving antenna 212, an antenna duplexer 221, receivers 231 and 232, a demodulator 241, a channel decoder 242, a control parameter extractor 251, a user data extractor 252, a reception quality estimator 253, a feedback data generator 254, a communication controller 261, a code book holder 262, a control parameter generator 271, a user data generator 272, a pilot signal generator 273, a channel encoder 281, a modulator 282, and a transmitter 291. Each mobile station 200a, 200b, 200c can also be implemented with a module configuration similar to that of the mobile station 200.

The transmitting and receiving antenna 211 is a transmission and reception shared antenna. The transmitting and receiving antenna 211 outputs a receive signal from the radio base station 100 to the antenna duplexer 221, and receives a transmit signal from the antenna duplexer 221 for transmission to the radio base station 100. On the other hand, the reception antenna 212 is a reception dedicated antenna. The reception antenna 212 supplies the receive signal from the radio base station 100 to the receiver 232.

The antenna duplexer 221 is a device which separates a transmit signal and a receive signal from each other. The antenna duplexer 221 supplies the receive signal supplied from the transmitting and receiving antenna 211 to the receiver 231, and supplies the transmit signal supplied from the transmitter 291 to the transmitting and receiving antenna 211.

The receiver 231 converts the receive signal supplied from the antenna duplexer 221 to the baseband signal, and supplies the converted baseband signal to the demodulator 241. Similarly, the receiver 232 converts the receive signal supplied from the reception antenna 212 to the baseband signal, and supplies the converted baseband signal to the demodulator 241. For the purpose of performing this conversion processing, each receiver 231, 232 includes, for example, a low noise amplifier, a frequency converter, a band-limiting filter, an analog to digital converter, and a quadrature demodulator.

The demodulator 241 performs diversity synthesis of the two baseband signals supplied from the receivers 231 and 232, and applies a demodulation process according to a demodulation method corresponding to the downlink data communication under the control of the communication controller 261. Then, the demodulator 241 supplies the demodulated signal to the channel decoder 242.

Here, the reason why the mobile station 200 does not apply a process of multiplying the weight vector to the receive signal is that the process of previously multiplying the weight is performed on the radio base station side. The weight vector multiplied on the radio base station side can be set to a weight on which a characteristic of a transmission line is also reflected.

When the demodulator 241 does not perform diversity synthesis, a signal may be received by one antenna. Or alternatively, when a different signal is transmitted from each of a plurality of antennas of the radio base station 100, each of first and second antennas of the mobile station 200 receives those signals and separately demodulates them, thereby performing MIMO reception processing.

The channel decoder 242 applies a decoding process to the demodulated signal supplied from the demodulator 241 according to the decoding method corresponding to the downlink data communication under the control of the communication controller 261. For example, the channel decoder 242 applies a de-interleaving process and error correction process. Then, the channel decoder 242 supplies the obtained decoded data to the control parameter extractor 251 and the user data extractor 252.

The control parameter extractor 251 extracts the control parameters generated by the radio base station 100 from the decoded data supplied from the channel decoder 242, and supplies the extracted control parameters to the communication controller 261. Here, the extracted control parameter includes data indicating a multi-antenna communication method, data indicating a feedback data request for allocating the weight vector, data indicating an encoding method of the user data, and allocation information on radio resources through the uplink transmission line.

The user data extractor 252 extracts user data blocks from among the decoded data blocks supplied from the channel decoder 242, and takes the extracted user data blocks into the inside. The mobile station 200 reproduces the taken user data blocks according to a type of data. For example, when the user data is voice data, a voice is reproduced, whereas when the user data is text data or image data, a screen is displayed.

The reception quality estimator 253 continuously performs an estimation process of the communication quality of the downlink transmission line from the radio base station 100 to the mobile station 200 based on the demodulated signal supplied from the demodulator 241 and the decoded data supplied from the channel decoder 242. Then, the reception quality estimator 253 supplies the estimated result to the control parameter generator 271.

When receiving the instruction of the estimation process of the communication quality for allocating the weight vector from the communication controller 261, the reception quality estimator 253 performs an estimation process of the communication quality in the case where each weight vector of the code book holder 262 is applied. Note, however, that when receiving the specification of the candidates of the weight vector from the communication controller 261, the reception quality estimator 253 limits a target range to the specified weight vector and performs an estimation process of the communication quality. Then, the reception quality estimator 253 supplies the estimated result to the feedback data generator 254.

The feedback data generator 254 determines an optimal one or a plurality of weight vectors based on the estimated result supplied from the reception quality estimator 253. Then, the feedback data generator 254 generates the feedback data indicating the determination result, and outputs the generated feedback data to the control parameter generator 271. In the feedback data, a number for identifying each weight vector is used here to specify the optimal weight vector.

The communication controller 261 controls operations of the mobile station 200 based on the control parameters supplied from the control parameter extractor 252. For example, the communication controller 261 determines, based on the control parameters, the communication method such as a modulation method and encoding method adopted by the radio base station 100, and controls the demodulator 241 and the channel decoder 242. When obtaining the control parameters indicating a feedback data request for allocating the weight vector, the communication controller 261 instructs the reception quality estimator 253 to perform an estimation process of the communication quality. Further, the communication controller 261 instructs the control parameter generator 271 to transmit the control parameters to the radio base station 100, if necessary.

The code book holder 262 holds a code book. The code book held by the code book holder 262 is the same as that of the radio base station 100. The code book holder 262 notifies the reception quality estimator 253 of a necessary weight vector under the control of the communication controller 261.

According to the instruction from the communication controller 261, the control parameter generator 271 generates the control parameters to the radio base station 100 used for the communication control, and supplies the generated control parameters to the channel encoder 281. Here, the control parameter transmitted through the uplink transmission line includes data on the estimated result of the communication quality supplied from the reception quality estimator 253, the feedback data supplied from the feedback data generator 254, and acknowledgement (ACK)/negative acknowledgement (NACK) to the reception of the user data.

The user data generator 272 generates the user data addressed to other mobile stations or computers, and supplies the generated user data to the channel encoder 281. Examples of the user data include text data such as voice data and e-mail data, and image data.

The pilot signal generator 273 generates a pilot signal of a predetermined signal sequence, and supplies the generated pilot signal to the modulator 282. For example, the radio base station 100 uses the pilot signal to estimate the communication quality of the uplink transmission line.

The channel encoder 281 applies an encoding process to the control parameters supplied from the control parameter generator 271 and the user data supplied from the user data generator 272 according to the encoding method corresponding to the uplink data communication under the control of the communication controller 261. For example, the channel encoder 281 applies an interleaving process and error correction encoding process. Then, the channel encoder 281 supplies the encoded data to the modulator 282.

The modulator 282 applies a process to the encoded data supplied from the channel encoder 281 according to the modulation method corresponding to the uplink data communication under the control of the communication controller 261. The modulator 282 applies, for example, a modulation process such as QPSK and QAM, and a bit repetition process. Further, the modulator 282 inserts the pilot signal supplied from the pilot signal generator 273 into a subcarrier. Then, the modulator 282 supplies the modulating signal to the transmitter 291.

The transmitter 291 converts the modulating signal supplied from the modulator 282 to a transmit signal for transmission to the radio base station 100, and supplies the transmit signal to the antenna duplexer 221. For the purpose of performing this conversion process, the transmitter 291 has, for example, a quadrature modulator, a digital to analog converter, a frequency converter, a band-limiting filter, and a power amplifier.

FIG. 5 illustrates a relationship between the transmit signal and the weight vector. The multi-antenna controller 183 of the radio base station 100 applies a weighting process as illustrated in FIG. 5. Specifically, with respect to a vector x representing a transmission stream as a modulating signal sequence to be transmitted and a matrix W representing the weight vectors allocated to the mobile stations 200, 200a, 200b, and 200c, a vector y representing the transmit signal is calculated as y=W·x.

Here, a size of the vector x is n (n≥1), a size of the matrix W is m×n (m≥1), and a size of the vector y is m. Further, m is the number of antennas used for transmission, and n is the number of transmission streams for simultaneous transmission. Each column of the matrix W is equal to one weight vector. In the matrix W, the weight vectors are combined so as to suppress interference between the transmission streams. Each weight in the weight vector is a coefficient for adjusting a phase and amplitude of the transmission stream for transmission, and can be represented by a complex number.

In the weighting process, the j-th (1≤j≤n) transmission stream in the vector x and the weight vector of the j-th column within the matrix W are associated with each other. In other words, when the j-th transmission stream and the weight vector of the j-th column are multiplied together, the distribution to a plurality of antennas of the j-th transmission stream is determined. In addition, one transmission stream may be associated with one mobile station, or a plurality of transmission streams may be associated with one mobile station. The latter case means that the radio base station 100 transmits different data blocks to the same mobile station at the same time. In this case, the radio base station 100 allocates a plurality of weight vectors to one mobile station.

FIG. 6 illustrates a configuration example of the code book. The code book holder 162 of the radio base station 100 holds a set of the code book as illustrated in FIG. 6. Also, the code book holder 262 of each mobile station 200, 200a, 200b, 200c holds the same set of code books as that of the code book holder 162 of the radio base station 100. This example assumes that the number of the transmission streams is four, the number of the weight vectors of each code book is four, and the number of the code books is eight.

The code book number is given to each code book. Specifically, the code numbers from 0 (000 as a binary number) to 7 (111 as a binary number) are given to eight code books, respectively. Here, even if two arbitrary weight vectors belonging to the same code book are used in parallel, interference between the transmission streams is reduced. On the other hand, when two arbitrary weight vectors belonging to different code books are used in parallel, interference between the transmission streams may become large.

In the above-described set of the code books, each weight vector can be identified by a combination of the code book number and the column number. A weight vector including (0.3780, −0.2698−j0.1578, 0.5957+j0.1578, 0.1587−j0.2411), for example, can be identified by data of the code book number 001+the column number 1.

Next, the communication control to be performed in the radio communication system including the above-described configuration and data structure will be described in detail.

Figure 7:
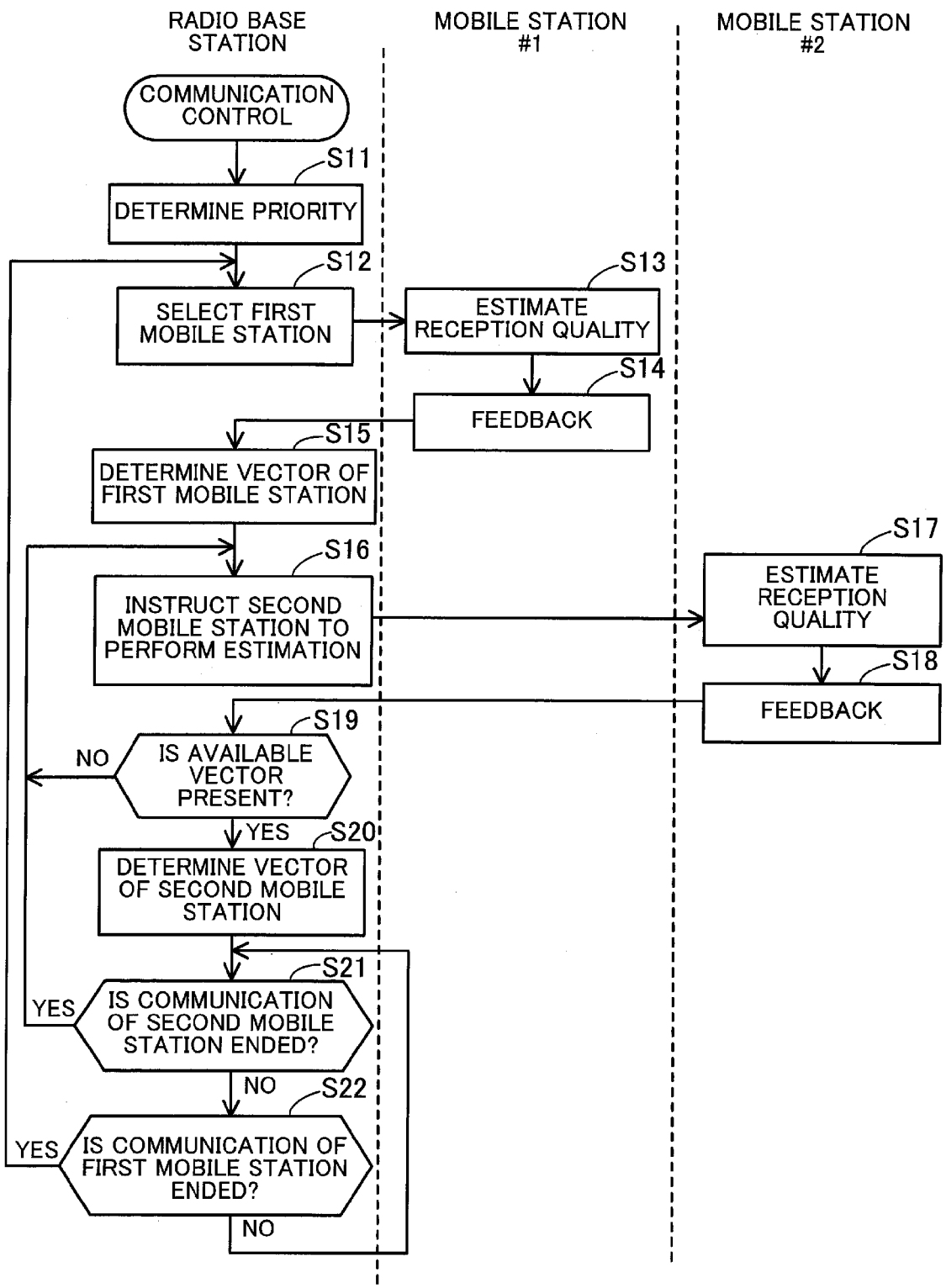
FIG. 7 is a flowchart illustrating a procedure of a first multi-antenna communication control.

FIG. 7 is a flowchart illustrating a procedure of a first multi-antenna communication control. A process illustrated in FIG. 7 will be described below along step numbers.

[Step S11] The scheduler 163 of the radio base station 100 determines priority of the mobile stations 200, 200a, 200b, and 200c, and divides one first mobile station for preferentially allocating the optimal weight vector and all second mobile stations except the one first mobile station. Here, the scheduler 163 determines the priority of the mobile station based on the quality of service (QoS) of the transmission stream, the data priority of users of the mobile stations, and the present communication state such as a communication quality and a traveling speed of the mobile station. Then, the scheduler 163 supplies data on the priority to the communication controller 161.

In the following description, it is assumed that the scheduler 163 determines the mobile station 200 to be the first mobile station and the mobile stations 200a, 200b, and 200c to be the second mobile stations. Further, in relation to the second mobile stations, only the mobile station 200a is typically considered.

[Step S12] The communication controller 161 of the radio base station 100 instructs the control parameter generator 171 to request the feedback data to the mobile station 200 determined to be the first mobile station at step S11. At this time, the communication controller 161 does not limit the weight vector as an estimation target of the communication quality. The control parameter generator 171 generates the control parameters according to the instruction from the communication controller 161. The control parameters are transmitted to the mobile station 200.

[Step S13] The communication controller 261 of the mobile station receives the control parameters generated by the control parameter generator 171 of the radio base station 100 at step S12, and instructs the reception quality estimator 253 to perform an estimation process of the communication quality. At this time, the communication controller 261 does not limit the weight vector as an estimation target of the communication quality. The reception quality estimator 253 performs an estimation process of the communication quality in the case where each weight vector is applied in relation to all the weight vectors of the code book holder 262. Then, the reception quality estimator 253 supplies the estimated result to the feedback data generator 254.

Since capable of separating in each antenna a signal transmitted from each antenna (frequency and diffusion code), the radio base station 100 can estimate a propagation path for each antenna and specify the weight vector that the communication quality becomes best.

[Step S14] The feedback data generator 254 of the mobile station 200 generates feedback data based on the estimated result supplied from the reception quality estimator 253 at step S13. This feedback data includes the code book number corresponding to the weight vector to be determined to be optimal based on the estimated result and the column number (data capable of specifying the weight vector) in the code book. Then, the feedback data generator 254 supplies the feedback data to the control parameter generator 271. This feedback data is transmitted to the radio base station 100 as the control parameters.

[Step S15] The communication controller 161 of the radio base station 100 receives the feedback data generated by the feedback data generator 254 of the mobile station 200 at step S14. The communication controller 161 determines the weight vector to be allocated to the mobile station 200 based on this feedback data. Then, the communication controller 161 starts a multi-antenna transmission to the mobile station 200.

[Step S16] The communication controller 161 of the radio base station 100 instructs the control parameter generator 171 to request the feedback data to the mobile station 200a determined to be the second mobile station at step S11. At this time, the communication controller 161 limits the weight vector as an estimation target of the communication quality to the weight vectors belonging to the same code book as that of the weight vector allocated to the first mobile station at step S15.

The control parameter generator 171 generates the control parameters according to the instruction from the communication controller 161. Those control parameters include the code book number as data indicating the weight vector as an estimation target. The control parameters are transmitted to the mobile station 200a. In addition, the control parameter further may include the column numbers representing the weight vectors (or the weight vectors not allocated to other mobile stations) allocated to other mobile stations in the specified code book. In this case, the communication controller 161 can further limit a target range of the estimation process of the communication quality through the mobile station 200a.

[Step S17] The mobile station 200a performs the same process as that performed by the mobile station 200 at step S13. Note that the mobile station 200a limits a target range of the estimation process of the communication quality to the weight vectors (a part or the whole of the weight vectors in the code book according to content of the control parameters) in the code book specified by the control parameters generated by the control parameter generator 171 of the radio base station 100 at step S16, and performs an estimation process of the communication quality.

[Step S18] The mobile station 200a transmits as the control parameters the feedback data indicating a result of the estimation process of the communication quality at step S17 to the radio base station 100 in the same manner as in the process performed by the mobile station 200 at step S14. This feedback data includes the column number (data capable of specifying the weight vector) corresponding to the weight vector determined to be optimal based on the estimated result. Since the code book number is specified by the control parameters from the radio base station 100, the feedback data avoids the need to include the code book number. Or alternatively, for confirmation, the feedback data may include the code book number.

[Step S19] The communication controller 161 of the radio base station 100 receives the feedback data generated by the mobile station 200a at step S18. Then, the communication controller 161 compares the optimal weight vector for the mobile station 200a with the weight vectors allocated to other mobile stations, and determines whether a weight vector capable of being allocated to the mobile station 200a is present. If so, the process advances to step S20. If not, the process returns to step S16 and the communication controller 161 performs an estimation process of the communication quality again. For the reduction in a throughput, the communication controller 161 can provide the waiting time based on a state of the propagation path up to reperformance of the estimation process of the communication quality.

[Step S20] The communication controller 161 of the radio base station 100 determines the weight vector to be allocated to the mobile station 200a. Then, the communication controller 161 multiplexes data to the mobile station 200a with that to the mobile station 200, and starts the multi-antenna transmission to the mobile station 200a.

[Step S21] The communication controller 161 of the radio base station 100 determines whether to end a data transmission to the mobile station 200a. If so, the process returns to step S16 and the communication controller 161 reallocates the weight vector to the second mobile station. If not, the process proceeds to step S22.

[Step S22] The communication controller 161 of the radio base station 100 determines whether to end the data transmission to the mobile station 200. If so, the process returns to step S12 and the communication controller 161 selects the first mobile station. Or alternatively, if so, the process returns to step S11 and the communication controller 161 can retry the process from the determination of the priority. If not, the process returns to step S21.

The above steps permit the radio base station 100 to first determine the priority of the mobile stations 200, 200a, 200b, and 200c, and select the first mobile station. Next, the radio base station 100 allows the first mobile station to estimate the optimal weight vector from among the entire code book, and allocates the weight vector to the first mobile station. Then, the radio base station 100 limits a target range to the weight vectors belonging to the same code book as that of the weight vector allocated to the first mobile station, and allows all the mobile stations except the first mobile station to estimate the optimal weight vector, thus allocating the weight vectors to the mobile stations.

When a plurality of the second mobile stations are present, the radio base station 100 may apply processes of the steps S16 to S20 to each mobile station one by one in sequence, or to a plurality of the mobile stations in parallel. Further, the radio base station 100 may also order the second mobile stations according to the priority at the step S11, and allocate the weight vectors to the second mobile stations in sequence.

The control method illustrated in FIG. 7 assumes that the radio base station 100 fixedly allocates the weight vector to the first mobile station until the data transmission to the first mobile station ends. Alternatively, the radio base station 100 may set the allocated time, and perform a reallocation process when the allocated time has elapsed.

Figure 8:
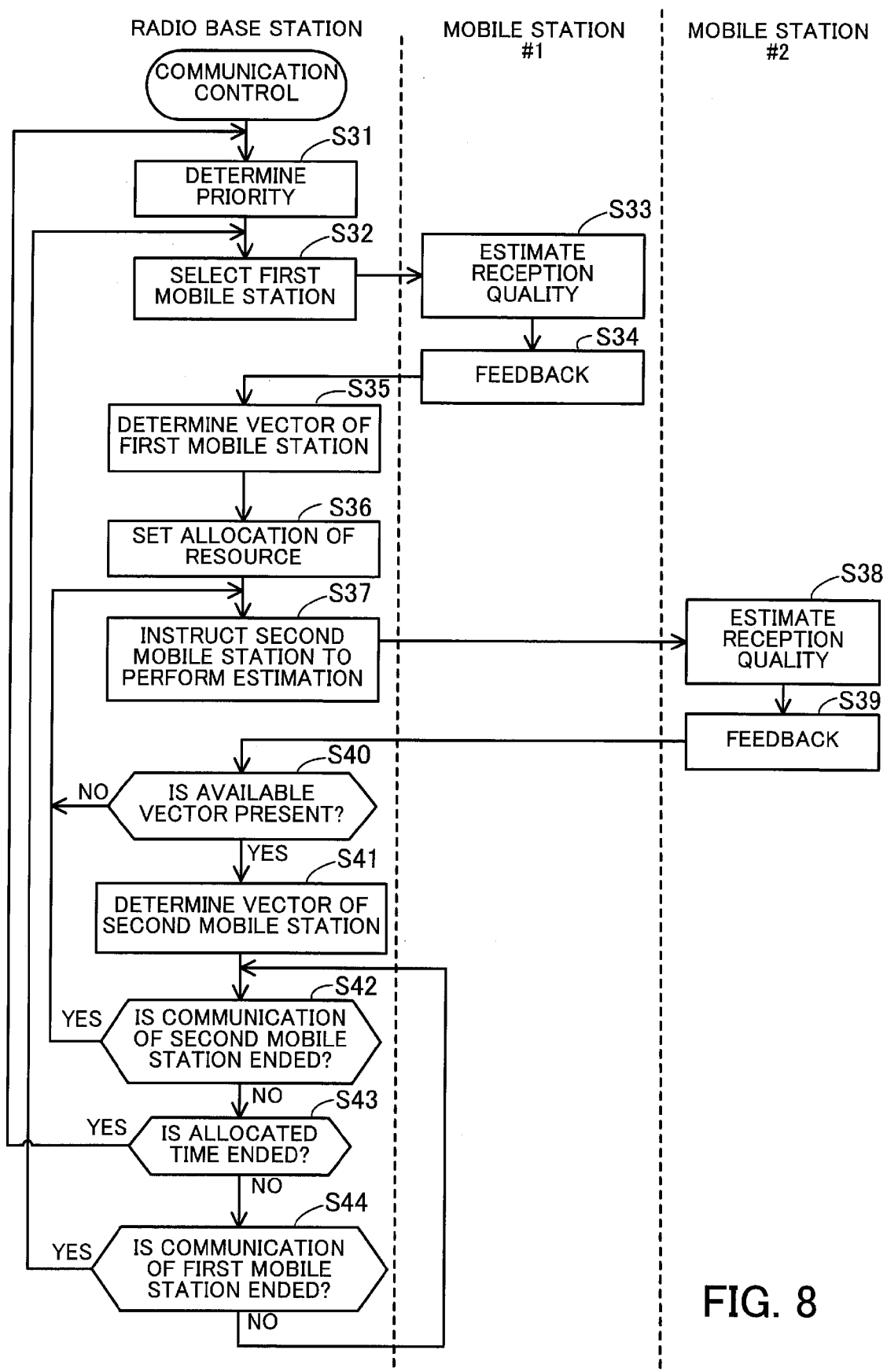
FIG. 8 is a flowchart illustrating a procedure of a second multi-antenna communication control.

FIG. 8 is a flowchart illustrating a procedure of the second multi-antenna communication control. Among steps S31 to S44 illustrated in FIG. 8, processes of steps S31 to S35 are the same as those of the steps S11 to S15 and processes of steps S37 to S41 are the same as those of the steps S16 to S20 and therefore, the description will not be repeated here.

[Step S36] The communication controller 161 of the radio base station 100 sets the allocated time and the allocated frequency band to the mobile station 200 as the first mobile station.

[Step S42] The communication controller 161 of the radio base station 100 determines whether to end the data transmission to the mobile station 200a as the second mobile station. If so, the process returns to step S37, and the communication controller 161 reallocates the weight vector to the second mobile station. If not, the process proceeds to step S43.

[Step S43] The communication controller 161 of the radio base station 100 determines whether the allocated time set to the mobile station 200 at step S36 has elapsed. If so, the process returns to step S31, and the communication controller 161 redetermines the priority of the mobile station. If not, the process proceeds to step S44.

[Step S44] The communication controller 161 of the radio base station 100 determines whether to end the data transmission to the mobile station 200. If so, the process returns to step S32, and the communication controller 161 reallocates the weight vector to the mobile station 200. If not, the process returns to step S42.

The above steps permit the radio base station 100 to first determine the priority of the mobile stations 200, 200a, 200b, and 200c, and select the first mobile station. Next, the radio base station 100 allocates the weight vector to the first mobile station, and sets the allocated time thereto. Then, the radio base station 100 allocates the weight vector to all the mobile stations except the first mobile station. Here, when the allocated time to the first mobile station has elapsed, even if the data transmission to the first mobile station is being continued, the radio base station 100 redetermines the priority of the first mobile station and reallocates the weight vector to the first mobile station. Similarly, the radio base station 100 may set the allocated time of the weight vector also to the second mobile station.

Next, a flow of the communication performed between the radio base station 100 and any one of the mobile stations 200, 200a, 200b, and 200c in the case of performing allocation control of the weight vector by the method illustrated in FIG. 8 will be described.

Figure 9:
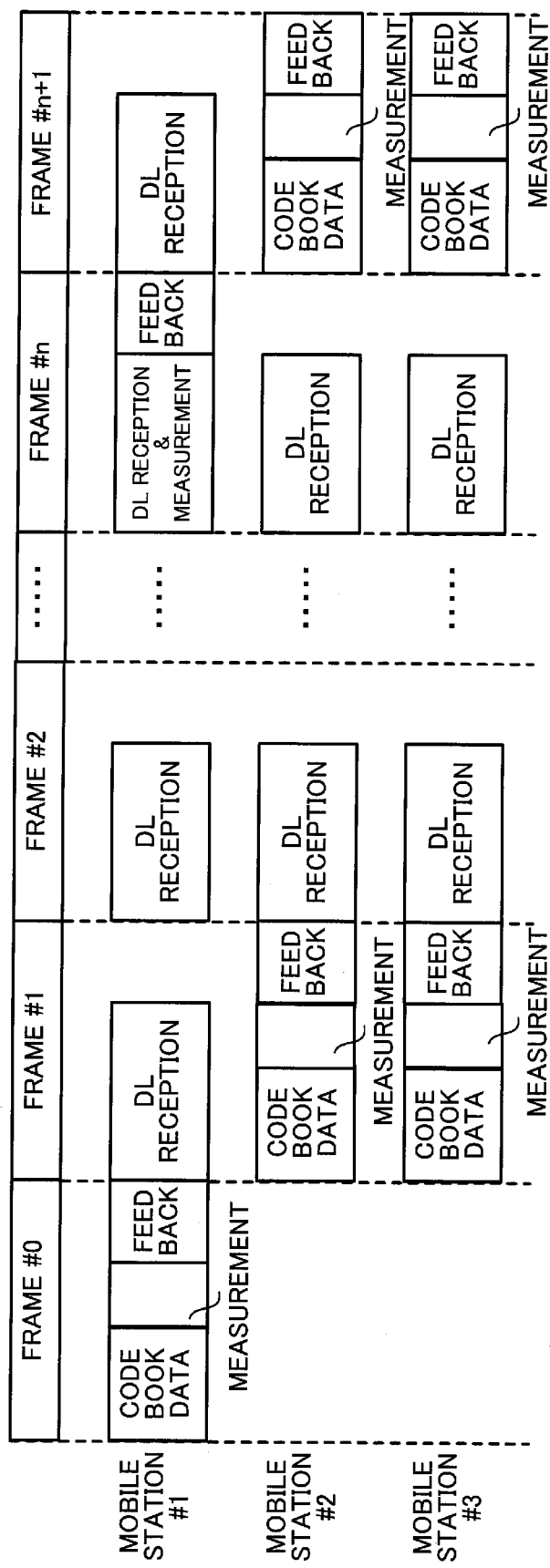
FIG. 9 illustrates a communication example between the radio base station and the mobile station according to the first embodiment.

FIG. 9 illustrates a communication example between the radio base station and the mobile station according to the first embodiment. This example assumes the case of using a time division duplex (TDD) system as the simultaneous transmission and reception system. Here, the mobile station #1 is a mobile station determined to be the first mobile station, specifically, the mobile station 200. The mobile stations #2 and #3 are mobile stations determined to be the second mobile stations, specifically, the mobile stations 200a and 200b. Further, frames #0 to #n+1 illustrate a frame time in the case of setting a certain point as a standard.

In the frame #0, the radio base station 100 transmits information for instructing the mobile station 200 to perform an estimation process of the communication quality. Here, the radio base station 100 does not limit the weight vectors as an estimation target. Accordingly, the mobile station 200 performs an estimation process of the communication quality to the weight vectors of the entire code book. Then, the mobile station 200 transmits the feedback data to the radio base station 100. As a result, the radio base station 100 determines the allocation of the weight vector to the mobile station 200. Further, the radio base station 100 sets the allocated time to n frame times (frames #1 to #n). Here, the radio base station 100 can adaptively determine the allocated time according to a communication state such as the communication quality and the traveling speed of the mobile station.

In the frame #1, the radio base station 100 starts the multi-antenna transmission to the mobile station 200. Further, the radio base station 100 transmits information for instructing the mobile stations 200a and 200b to perform an estimation process of the communication quality. Here, the radio base station 100 specifies a number of the code book to which the weight vector allocated to the mobile station 200 belongs. According to the specified code book number, the mobile stations 200a and 200b perform an estimation process of the communication quality to the weight vectors belonging to the specified code book. Then, the mobile stations 200a and 200b transmit the feedback data to the radio base station 100. As a result, when capable of performing the simultaneous transmission to the mobile stations 200, 200a, and 200b, the radio base station 100 determines the allocation of the weight vectors to the mobile stations 200a and 200b.

During the frames #2 to #n, the radio base station 100 applies the weight vectors allocated to the mobile stations 200, 200a, and 200b for precoding MIMO communication. The mobile stations 200, 200a, and 200b receive a radio signal transmitted by the radio base station 100 to receive the user data transmitted to its own station.

In the frame #n, when continuously determining that the mobile station 200 is a mobile station with the highest priority, the radio base station 100 transmits to the mobile station 200 the control parameters indicating that update of the weight vector is necessary. According to the received control parameters, the mobile station 200 performs an estimation process of the communication quality to the weight vectors of the entire code book while receiving the user data. Then, the mobile station 200 transmits the feedback data to the radio base station 100. As a result, the radio base station 100 updates the allocation of the weight vector to the mobile station 200. Further, the radio base station 100 sets the allocated time to n frame time (frames #n+1 to #2n).

In the frame #n+1, the radio base station 100 resumes the multi-antenna transmission to the mobile station 200. Further, the radio base station 100 transmits information for instructing the mobile stations 200a and 200b to perform an estimation process of the communication quality. According to the received information, the mobile stations 200a and 200*b* perform an estimation process of the communication quality to the weight vectors belonging to the code book specified by the radio base station 100. Then, the mobile stations 200*a* and 200*b* transmit the feedback data to the radio base station 100. As a result, the radio base station 100 updates the allocation of the weight vectors to the mobile stations 200*a* and 200*b*.

When failing to change the weight vector before and after the update of the allocation to the mobile station 200 and continuing the data transmission to the mobile stations 200*a* and 200*b*, the radio base station 100 may automatically update the allocation to the mobile stations 200*a* and 200*b* without allowing the mobile stations 200*a* and 200*b* to perform an estimation process of the communication quality in the frame #n+1.

The proposed mobile communication system can allocate the optimal weight vector to the first mobile station with the highest priority. In relation to the other mobile stations, the mobile communication system can limit a target range of the estimation process of the communication quality to the weight vectors belonging to the code book selected by the first mobile station, and significantly reduce a processing burden, a circuit size, and power consumption. Further, the mobile communication system can also reduce the amount of data of the feedback data and therefore, reduce a ratio of the radio resource for the feedback data occupied in the entire radio resource through the uplink transmission line.

In particular, as the number of the previously-defined code books is more selected, the above-described effect is more remarkable. Specifically, when the code books in the number of c each having the weight vectors in the number of n are defined, the first mobile station can select the optimal weight vector from among those in the number of n×c. On the other hand, the other mobile stations may select an appropriate weight vector from among the weight vectors in the number of 1/c (or, equal to or smaller than 1/c) of the above-described number. The amount of data for individually identifying the weight vectors in the number of n×c is necessary in the feedback data from the first mobile station. On the other hand, the amount of data for individually identifying the weight vectors in the number of n is sufficient in the feedback data from the other mobile stations.

Second Embodiment

A second embodiment of the present invention will now be described below in detail with reference to FIG. 10 and subsequent drawings. Since the second embodiment shares some elements with the foregoing first embodiment, the following discussion will focus on their distinctive points, omitting explanations of similar elements.

Figure 10:
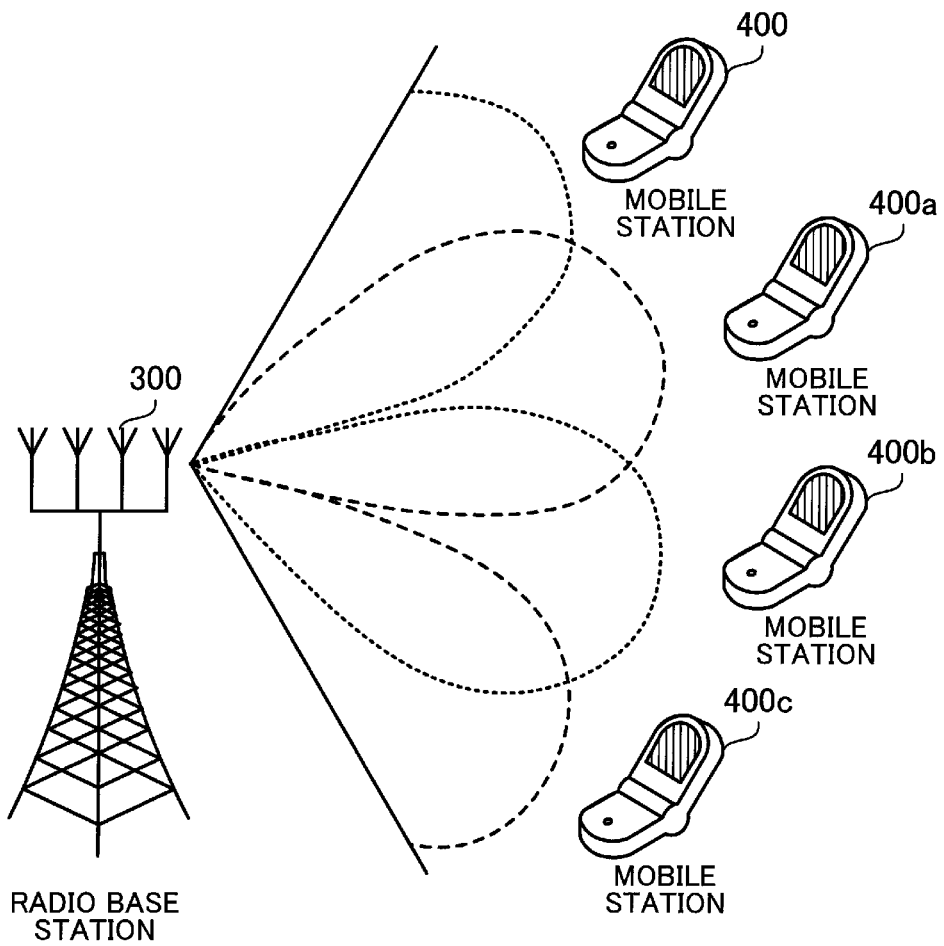
FIG. 10 illustrates a system configuration according to a second embodiment.

FIG. 10 illustrates a system configuration according to the second embodiment. The mobile communication system according to the second embodiment is a radio communication system in which a radio base station communicates wirelessly with a plurality of mobile stations in the same manner as in the first embodiment. This mobile communication system includes a radio base station 300 and mobile stations 400, 400*a*, 400*b*, and 400*c*.

Functions of the radio base station 300 and the mobile stations 400, 400*a*, 400*b*, and 400*c* are fundamentally the same as those of the radio base station 100 and mobile stations 200, 200*a*, 200*b*, and 200*c* according to the first embodiment. Note that the radio base station 300 is capable of forming four orthogonal directional beams using four transmitting and receiving antennas. The radio base station 300 adaptively controls beam directivity, and outputs a beam to a desired mobile station. Further, the four transmitting and receiving antennas of the radio base station 300 are installed so as to increase a spatial correlation between transmit signals.

Figure 11:
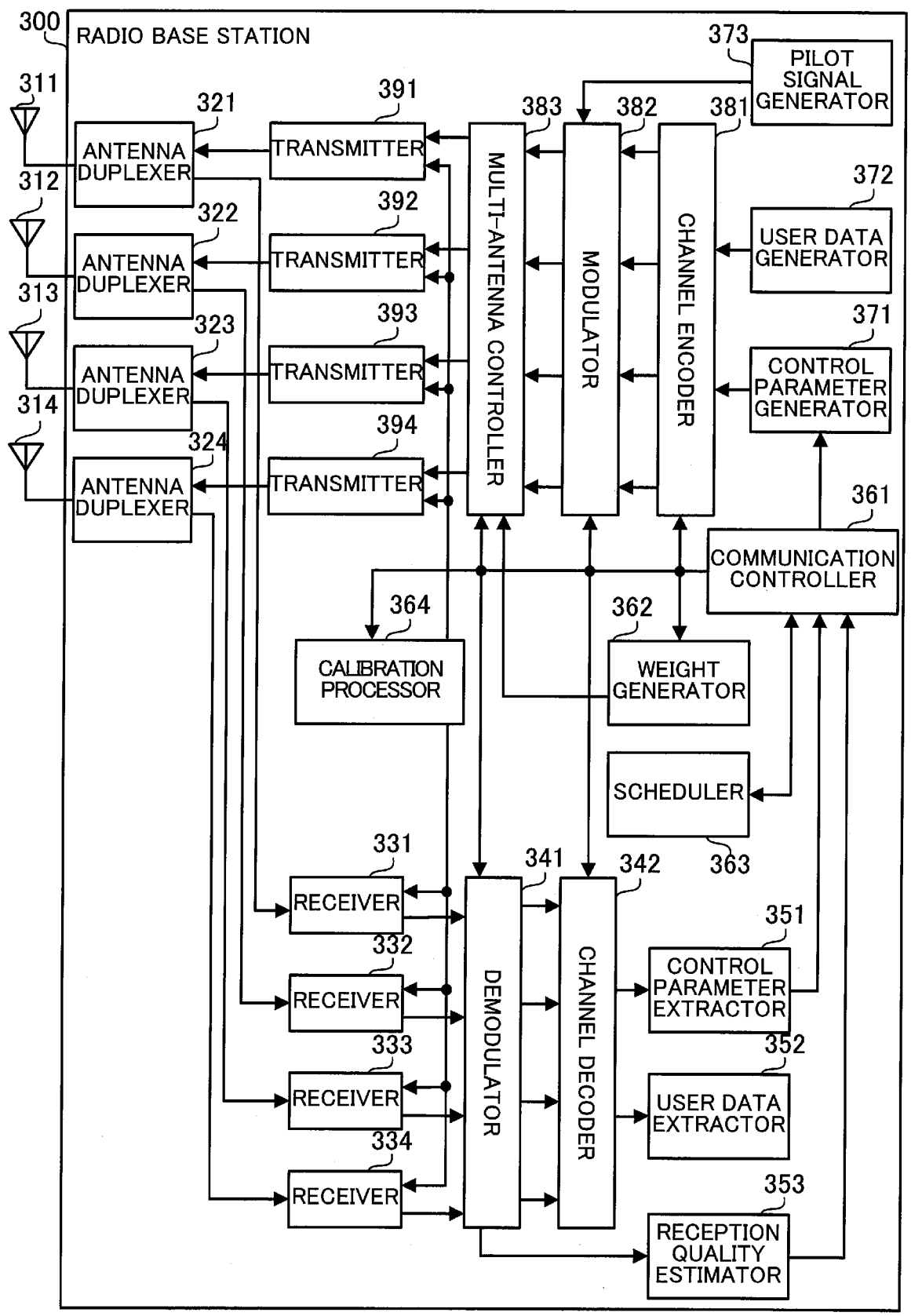
FIG. 11 illustrates a function of the radio base station according to the second embodiment.

FIG. 11 illustrates a function of the radio base station according to the second embodiment. The radio base station 300 includes the following elements: transmitting and receiving antennas 311, 312, 313, and 314, antenna duplexers 321, 322, 323, and 324, receivers 331, 332, 333, and 334, a demodulator 341, a channel decoder 342, a control parameter extractor 351, a user data extractor 352, a reception quality estimator 353, a communication controller 361, a weight generator 362, a scheduler 363, a calibration processor 364, a control parameter generator 371, a user data generator 372, a pilot signal generator 373, a channel encoder 381, a modulator 382, a multi-antenna controller 383, and transmitters 391, 392, 393, and 394.

The transmitting and receiving antennas 311, 312, 313, and 314, antenna duplexers 321, 322, 323, and 324, demodulator 341, channel decoder 342, control parameter extractor 351, user data extractor 352, reception quality estimator 353, scheduler 363, control parameter generator 371, user data generator 372, pilot signal generator 373, channel encoder 381, modulator 382, and multi-antenna controller 383 provide the same functions as their respective counterparts in the radio base station 100 according to the foregoing first embodiment illustrated in FIG. 3.

Each receiver 331, 332, 333, 334 converts a receive signal supplied from each antenna duplexer 321, 322, 323, 324 to a baseband signal, and supplies the converted baseband signal to the demodulator 341. At this time, the receivers 331, 332, 333, and 334 perform a correction process of a phase difference of the receive signal generated between the transmitting and receiving antennas 311, 312, 313, and 314 according to the instruction from the calibration processor 364.

The communication controller 361 controls operations in the radio base station 300 based on the control parameters supplied from the control parameter extractor 351, the estimated result of the communication quality supplied from the reception quality estimator 353, and the instruction from the scheduler 363.

For example, the communication controller 361 determines a communication system applied to the mobile stations 400, 400*a*, 400*b*, and 400*c*, and controls the demodulator 341, the channel decoder 342, the channel encoder 381, and the modulator 382. The communication controller 361 determines the weight vectors allocated to the mobile stations 400, 400*a*, 400*b*, and 400*c*. Further, the communication controller 361 controls the multi-antenna controller 383, and controls generation of the weight vectors using the weight generator 362.

The communication controller 361 controls the calibration processor 364 so as to correct a phase difference of a signal generated between the transmitting and receiving antennas 311, 312, 313, and 314. Further, the communication controller 361 instructs the control parameter generator 371 to transmit the control parameters to the mobile stations 400, 400*a*, 400*b*, and 400*c*, if necessary.

The weight generator 362 manages the weight vectors allocated to the mobile stations 400, 400*a*, 400*b*, and 400*c*. Specifically, the weight generator 362 generates a plurality of the weight vectors so as to form four orthogonal directional beams under the control of the communication controller 361. This weight vector means a weight of an orthogonal multi-beam. Then, the weight generator 362 notifies the multi-antenna controller 383 of the generated weight vector.

The calibration processor 364 specifies a phase difference of a signal generated between the transmitting and receiving antennas 311, 312, 313, and 314 under the control of the communication controller 361. Then, the calibration processor 364 instructs the receivers 331, 332, 333, and 334 and the transmitters 391, 392, 393, and 394 to correct the phase difference of the signal.

Each transmitter 391, 392, 393, 394 converts a baseband signal supplied from the multi-antenna controller 383 to a transmit signal for transmission, and supplies the converted transmit signal to each antenna duplexer 321, 322, 323, 324. At this time, each transmitter 391, 392, 393, 394 performs a correction process of a phase difference of a transmit signal generated between the transmitting and receiving antennas 311, 312, 313, and 314 according to the instruction from the calibration processor 364.

Figure 12:
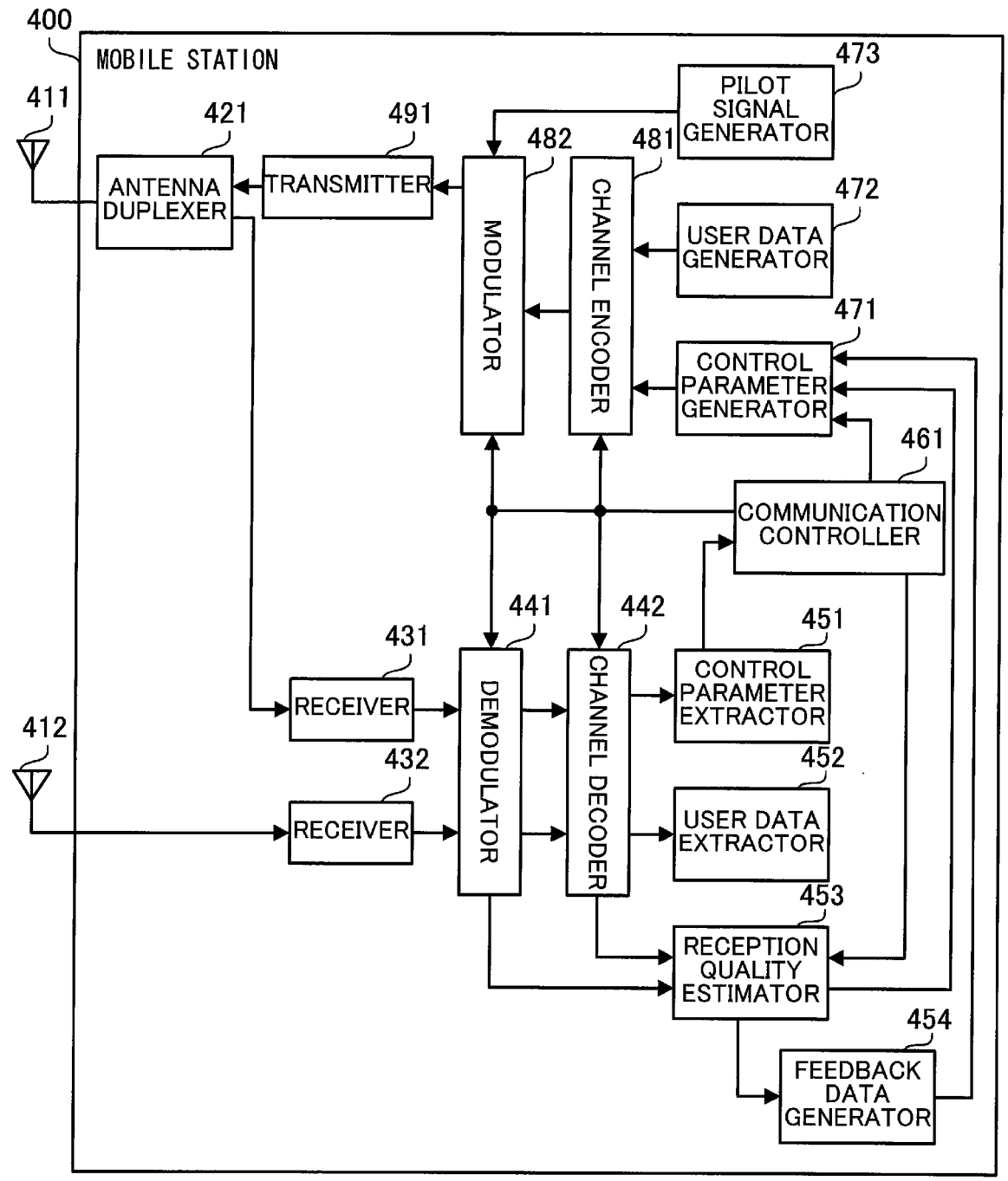
FIG. 12 illustrates a function of the mobile station according to the second embodiment.

FIG. 12 illustrates functions of the mobile station according to the second embodiment. The mobile station 400 includes the following elements: a transmitting and receiving antenna 411, a receiving antenna 412, an antenna duplexer 421, receivers 431 and 432, a demodulator 441, a channel decoder 442, a control parameter extractor 451, a user data extractor 452, a reception quality estimator 453, a feedback data generator 454, a communication controller 461, a control parameter generator 471, a user data generator 472, a pilot signal generator 473, a channel encoder 481, a modulator 482, and a transmitter 491. In addition, each mobile station 400a, 400b, 400c can also be implemented with a module configuration similar to that of the mobile station 400.

The transmitting and receiving antenna 411, receiving antenna 412, antenna duplexer 421, receivers 431 and 432, demodulator 441, channel decoder 442, control parameter extractor 451, user data extractor 452, control parameter generator 471, user data generator 472, pilot signal generator 473, channel encoder 481, modulator 482, and transmitter 491 provide the same functions as their respective counterparts in the mobile station 200 according to the foregoing first embodiment illustrated in FIG. 4.

The reception quality estimator 453 continuously performs an estimation process of the communication quality of the downlink transmission line based on the demodulated signal supplied from the demodulator 441 and the decoded data supplied from the channel decoder 442. Then, the reception quality estimator 453 supplies the estimated result to the control parameter generator 471.

When receiving the instruction of the estimation process of the communication quality for allocating the weight vector from the communication controller 461, the reception quality estimator 453 recognizes a predetermined reference signal contained in each directional beam transmitted by the radio base station 300, and performs an estimation process of the communication quality based on this reference signal. Note that when the communication controller 461 instructs candidates of the directional beam, the reception quality estimator 453 limits a target range to the specified directional beams and performs an estimation process of the communication quality. Then, the reception quality estimator 453 supplies the estimated result to the feedback data generator 454.

The feedback data generator 454 determines an optimal one or a plurality of directional beams based on the estimated result supplied from the reception quality estimator 453. Then, the feedback data generator 454 generates the feedback data indicating the determination result, and supplies the generated feedback data to the control parameter generator 471. Here, for the purpose of specifying the optimal directional beam, a beam number for identifying each directional beam is used in the feedback data.

The communication controller 461 controls operations within the mobile station 400 based on the control parameters supplied from the control parameter extractor 451. For example, the communication controller 461 determines the communication system adopted by the radio base station 300 based on the control parameters, and controls the demodulator 441 and the channel decoder 442. When obtaining the control parameters indicating the feedback data request for allocating the weight vector, the communication controller 461 instructs the reception quality estimator 453 to perform an estimation process of the communication quality. Here, when the beam number is included in the feedback data request, the communication controller 461 limits a target range to the directional beam with the beam number and instructs the reception quality estimator 453 and performs an estimation process of the communication quality. Further, the communication controller 461 instructs the control parameter generator 471 to transmit the control parameters to the radio base station 300, if necessary.

Figure 13:
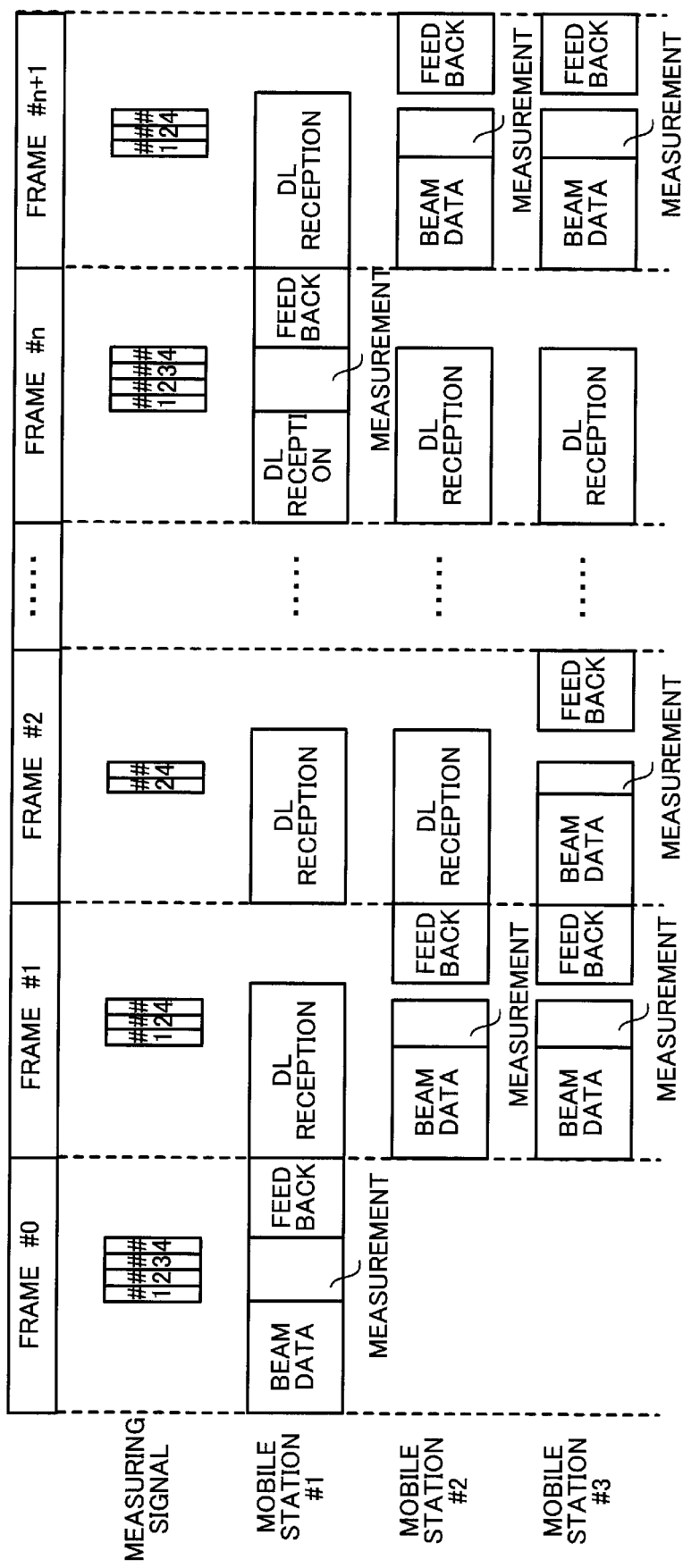
FIG. 13 illustrates a communication example between the radio base station and the mobile station according to the second embodiment.

FIG. 13 illustrates a communication example between the radio base station and the mobile station according to the second embodiment. This example assumes the case where the time division duplex system is used as the simultaneous transmission and reception system. Here, the mobile station #1 is a mobile station determined to be the first mobile station, specifically, the mobile station 400. The mobile stations #2 and #3 are mobile stations determined to be the second mobile station, specifically, the mobile stations 400a and 400b. Further, each frame #0 to #n+1 indicates the frame time at the time of using a certain point as a standard.

In the frame #0, the radio base station 300 transmits information for instructing the mobile station 400 to perform an estimation process of the communication quality. Here, the radio base station 300 does not limit the directional beam as an estimation target. The radio base station 300 outputs the reference signal in relation to each of four directional beams (beams #1 to #4). Based on the received reference signal, the mobile station 400 performs an estimation process of the communication quality to omnidirectional beams. Then, the mobile station 400 transmits the feedback data to the radio base station 300. As a result, the radio base station 300 determines the allocation of the weight vector to the mobile station 400. The radio base station 300 sets the allocated time to the n frame time (frames #1 to #n). Note that the radio base station 300 can adaptively determine the allocated time according to communication states such as a beam width of the directional beam and a traveling speed of the mobile station.

In the frame #1, the radio base station 300 starts to transmit the orthogonal multi-beam to the mobile station 400. The radio base station 300 transmits information for instructing the mobile stations 400a and 400b to perform an estimation process of the communication quality. Here, the radio base station 300 specifies numbers of all the directional beams (beams #1, #2, and #4) except the directional beam corresponding to the weight vector allocated to the mobile station 400. Further, the radio base station 300 outputs the reference signal in relation to each of the specified directional beams. Based on the received reference signal, each mobile station 400a, 400b performs an estimation process of the communication quality to the specified directional beams. Then, each mobile station 400a, 400b transmits the feedback data to the radio base station 300. The example of FIG. 13 assumes that the radio base station 300 can perform the simultaneous transmission to the mobile stations 400 and 400a, and determines the allocation of the weight vector to the mobile station 400a.

In the frame #2, the radio base station 300 starts to transmit the orthogonal multi-beam to the mobile station 400a. The radio base station 300 transmits information for instructing the not-yet allocated mobile station 400b to perform an estimation process of the communication quality again. Here, the radio base station 300 specifies numbers of all the directional beams (beams #2 and #4) except the directional beams corresponding to the weight vectors allocated to the mobile stations 400 and 400a. Further, the radio base station 300 outputs the reference signal in relation to each of the specified directional beams. Based on the received reference signal, the mobile station 400b performs an estimation process of the communication quality to the specified directional beam. Then, the mobile station 400b transmits the feedback data to the radio base station 300. As a result, the radio base station 300 determines the allocation of the weight vector to the mobile station 400b.

During the frames #3 to #n, the radio base station 300 uses the weight vectors allocated to the mobile stations 400, 400a, and 400b, and performs space division multiplexing (SDM) transmission using the orthogonal multi-beam. Each mobile station 400, 400a, 400b receives a radio signal transmitted by the radio base station 300, and receives the user data transmitted to its own station.

In the frame #n, when continuously determining that the mobile station 400 is a mobile station with the highest priority, the radio base station 300 transmits to the mobile station 400 the control parameters indicating that update of the weight vector is necessary. Further, the radio base station 300 outputs the reference signal in relation to each directional beam #1 to #4. Based on the received reference signal, the mobile station 400 performs an estimation process of the communication quality to the omnidirectional beams. Then, the mobile station 400 transmits the feedback data to the radio base station 300. As a result, the radio base station 300 updates the allocation of the weight vector to the mobile station 400. Further, the radio base station 300 sets the allocated time to the n frame time (frames #n+1 to #2n).

In the frame #n+1, the radio base station 300 resumes the orthogonal multi-beam transmission to the mobile station 400. Further, the radio base station 300 transmits information for instructing the mobile stations 400a and 400b to perform an estimation process of the communication quality, and outputs the reference signal in relation to each directional beam #1, #2, #4. Based on the received reference signal, each mobile station 400a, 400b performs an estimation process of the communication quality to the directional beams specified by the radio base station 300. Further, each mobile station 400a, 400b transmits the feedback data to the radio base station 300. As a result, the radio base station 300 updates the allocation of the weight vector to each mobile station 400a, 400b.

When preventing the weight vector from being changed before and after the update of the allocation to the mobile station 400 and continuing the data transmission to the mobile stations 400a and 400b, the radio base station 300 may automatically update the allocation to the mobile stations 400a and 400b without allowing them to perform an estimation process of the communication quality in the frame #n+1.

The proposed mobile communication system can allocate the weight vector to the first mobile station with the highest priority so as to form the optimal directional beam. In relation to the other mobile stations, the mobile communication system can limit a target range of the estimation process of the communication quality to the directional beams different from that selected by the first mobile station, and significantly reduce a processing burden, a circuit size, and power consumption. The mobile communication system can limit the number of the directional beams for transmitting the reference signal and reduce a ratio of radio resources for the reference signal illustrated in the entire radio resource through the downlink transmission line. Further, the mobile communication system can reduce the amount of data of the feedback data and reduce a ratio of radio resources for the feedback data occupied in the entire radio resource through the uplink transmission line.

The present embodiment (the first and second embodiments) describes the mobile communication system of a cellular communication system, and can be applied to other types of radio communication system. Further, all the radio communication terminals except the radio base station can perform the multi-antenna transmission control according to the present embodiment. The present embodiment describes the multi-antenna transmission such as the multi-antenna MIMO system and the beam forming system and further, can be applied to other transmission systems.

An antenna configuration according to the present embodiment can be arbitrarily changed according to a radio propagation path or an installation environment of communication apparatuses. Further, a part or the whole of the communication control function or scheduling function of the radio base station according to the present embodiment can be mounted on the radio control apparatuses except the radio base station.

The present embodiment permits the proposed mobile communication system to use an arbitrary modulation method or encoding method and further, an arbitrary multiplexing system such as a frequency division multiplexing (FDM) system, a time division multiplexing (TDM) system, a code division multiplexing (CDM) system, and an orthogonal frequency division multiplexing (OFDM) system. Here, in the case of using the CDM system, the mobile communication system can arbitrarily provide a module which performs a spreading process or despreading process. Or, in the case of using the OFDM system, the mobile communication system can arbitrarily provide a module which performs a fast fourier transform (FFT) or an inverse fast fourier transform (IFFT).

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

As can be seen from various embodiments discussed above, the proposed transmitting apparatus, transmission control method, and communication apparatus permit the processing burden to be reduced at the time of determining the allocation of the weight vector.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. A transmitting apparatus for transmitting signals in a multiplexed way by using a plurality of antennas according to weight vectors allocated to a plurality of receiving apparatuses, the transmitting apparatus comprising:

a controller to select a first receiving apparatus from among the plurality of receiving apparatuses, allocate the first receiving apparatus a first weight vector selected from one of a plurality of code books, cause a second receiving apparatus to provide feedback about communication quality, only for remaining weight vectors in the code book from which the first weight vector has been allocated to the first receiving apparatus, receive feedback data on the remaining weight vectors from the second receiving apparatus, and allocate the second receiving apparatus a second weight vector selected from among the remaining weight vectors based on the received feedback data.

2. The transmitting apparatus according to claim 1, wherein:
the transmitting apparatus and receiving apparatuses share the plurality of code books each representing a combination of weight vectors that can be used together for communication between the transmitting apparatus and the plurality of receiving apparatuses,
the controller sends an identification number of the code book used for the first receiving apparatus, when informing the second receiving apparatus of the remaining weight vectors.

3. The transmitting apparatus according to claim 1, wherein:
the plurality of antennas are used to form a plurality of directional beams toward the plurality of receiving apparatuses,
the controller sends an identification number of a directional beam formed with the first weight vector, when informing the second receiving apparatus of the remaining weight vectors.

4. The transmitting apparatus according to claim 1, wherein:
the controller sets an allocated time of the weight vector to the first receiving apparatus, updates allocation of the first weight vector for the first receiving apparatus when the allocated time has elapsed, and updates allocation of the second weight vector for the second receiving apparatus according to update results of the first receiving apparatus.

5. The transmitting apparatus according to claim 1, wherein:
the controller selects the first receiving apparatus from among the plurality of receiving apparatuses based on priority of packet data for transmission to each receiving apparatus, radio communication quality with respect to each receiving apparatus, or a combination thereof.

6. A transmission control method for transmitting signals in a multiplexed way by using a plurality of antennas according to weight vectors allocated to a plurality of receiving apparatuses, the transmission control method comprising:
selecting a first receiving apparatus from among the plurality of receiving apparatuses and allocating the first receiving apparatus a first weight vector selected from one of a plurality of code books;
causing a second receiving apparatus to provide feedback about communication quality, only for remaining weight vectors in the code book from which the first weight vector has been allocated to the first receiving apparatus; and
receiving feedback data on the remaining weight vectors from the second receiving apparatus, and allocating the second receiving apparatus a second weight vector selected from among the remaining weight vectors based on the received feedback data.

7. A communication apparatus, comprising:
a receiver to receive a signal transmitted from a transmitting apparatus;
a controller to estimate communication quality for each of a plurality of weight vectors informed of by the transmitting apparatus, the plurality of weight vectors being only a set of weight vectors remaining unused in one of a plurality of code books from which the transmitting apparatus has allocated weight vectors to other communication apparatuses; and
a transmitter to transmit feedback data to inform the transmitting apparatus of the communication quality estimated by the controller.

8. The communication apparatus according to claim 7, wherein:
the plurality of weight vectors informed of by the transmitting apparatus can be used together with weight vectors allocated to other communication apparatuses.

* * * * *